US011881039B2

(12) United States Patent
Alakarhu et al.

(10) Patent No.: US 11,881,039 B2
(45) Date of Patent: *Jan. 23, 2024

(54) LICENSE PLATE READING SYSTEM WITH ENHANCEMENTS

(71) Applicant: Axon Enterprise, Inc., Scottsdale, AZ (US)

(72) Inventors: Juha Alakarhu, Tampere (FI); Jesse Hakanen, Tampere (FI); Matti Suksi, Tampere (FI); James Bullock, Scottsdale, AZ (US); Mojtaba Solgi, Seattle, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,247

(22) Filed: Nov. 22, 2022

(65) Prior Publication Data

US 2023/0096661 A1    Mar. 30, 2023

Related U.S. Application Data

(63) Continuation of application No. 17/607,286, filed as application No. PCT/US2020/030789 on Apr. 30, (Continued)

(51) Int. Cl.
*G06V 20/62* (2022.01)
*B64C 39/02* (2023.01)
(Continued)

(52) U.S. Cl.
CPC ............ *G06V 20/63* (2022.01); *B64C 39/024* (2013.01); *B64D 47/08* (2013.01); *G06T 5/002* (2013.01);
(Continued)

(58) Field of Classification Search
CPC ........ G06V 20/63; G06V 10/24; G06V 10/30; G06V 20/17; G06V 20/56; G06V 20/58;
(Continued)

(56) References Cited

U.S. PATENT DOCUMENTS

| 10,715,738 B1 | 7/2020 | Alakarhu |
| 2003/0155513 A1 | 8/2003 | Remillard et al. |

(Continued)

FOREIGN PATENT DOCUMENTS

| JP | 2013-168738 A | 8/2013 |
| KR | 10-2017-0128971 A | 11/2017 |
| WO | 2016-0184844 A1 | 11/2016 |

OTHER PUBLICATIONS

File History of U.S. Appl. No. 16/399,654—filed Apr. 30, 2019.
(Continued)

*Primary Examiner* — Asghar H Bilgrami
(74) *Attorney, Agent, or Firm* — Banner & Witcoff, Ltd.

(57) ABSTRACT

System and methods are disclosed for capturing license plate (LP) information of a vehicle in relative motion to a camera device. In one example, the camera system detects the LP in multiple frames, then aligns and geometrically rectifies the image of the LP by scaling, warping, rotating, and/or performing other functions on the images. The camera system may optimize capturing of the LP information by executing a temporal noise filter on the aligned, geometrically rectified images to generate a composite image of the LP for optical character recognition. In some examples, the camera device may include an image sensor, such as a high dynamic range (HDR) sensor, modified to set long and short exposures of the HDR sensor to capture frames of a vehicle's LP, but without consolidating the images into a composite image. The camera system may set optimal exposure settings based on detected relative speed of the vehicle.

20 Claims, 25 Drawing Sheets

Related U.S. Application Data 2020, now Pat. No. 11,532,170, which is a continuation of application No. 16/399,607, filed on Apr. 30, 2019, now Pat. No. 11,030,472, and a continuation of application No. 16/399,654, filed on Apr. 30, 2019, now Pat. No. 10,715,738.

(60) Provisional application No. 62/841,060, filed on Apr. 30, 2019.

(51) Int. Cl.

| | | |
|---|---|---|
| *B64D 47/08* | (2006.01) | |
| *G06T 5/00* | (2006.01) | |
| *G06T 7/70* | (2017.01) | |
| *G06V 10/24* | (2022.01) | |
| *G06V 10/30* | (2022.01) | |
| *G06V 20/17* | (2022.01) | |
| *G06V 20/56* | (2022.01) | |
| *G06V 20/58* | (2022.01) | |
| *G06V 30/148* | (2022.01) | |
| *G08G 1/017* | (2006.01) | |
| *G08G 1/052* | (2006.01) | |
| *H04N 23/66* | (2023.01) | |
| *H04N 23/69* | (2023.01) | |
| *H04N 23/73* | (2023.01) | |
| *H04N 23/74* | (2023.01) | |
| *H04N 23/68* | (2023.01) | |
| *H04N 23/695* | (2023.01) | |
| *B64U 101/30* | (2023.01) | |

(52) U.S. Cl.
CPC ............... *G06T 7/70* (2017.01); *G06V 10/24* (2022.01); *G06V 10/30* (2022.01); *G06V 20/17* (2022.01); *G06V 20/56* (2022.01); *G06V 20/58* (2022.01); *G06V 30/153* (2022.01); *G08G 1/0175* (2013.01); *G08G 1/052* (2013.01); *H04N 23/66* (2023.01); *H04N 23/684* (2023.01); *H04N 23/69* (2023.01); *H04N 23/695* (2023.01); *H04N 23/73* (2023.01); *H04N 23/74* (2023.01); *B64U 2101/30* (2023.01); *G06T 2207/20132* (2013.01); *G06T 2207/20182* (2013.01); *G06T 2207/30252* (2013.01); *G06V 20/625* (2022.01)

(58) Field of Classification Search
CPC ..... G06V 30/153; B64C 39/024; G06T 5/002; G06T 7/70; G08G 1/0175; G08G 1/052; H04N 5/23203; H04N 5/2327
See application file for complete search history.

(56) References Cited

U.S. PATENT DOCUMENTS

| | | |
|---|---|---|
| 2007/0147055 A1 | 6/2007 | Komatsu |
| 2007/0211928 A1 | 9/2007 | Weng et al. |
| 2008/0100225 A1 | 5/2008 | Fujie |
| 2008/0181461 A1 | 7/2008 | Saito et al. |
| 2009/0225189 A1 | 9/2009 | Morin |
| 2010/0054539 A1* | 3/2010 | Challa .................. G06K 9/6293 |
| | | 382/105 |
| 2011/0240701 A1 | 10/2011 | Totani et al. |
| 2012/0105639 A1 | 5/2012 | Stein et al. |
| 2013/0105853 A1 | 5/2013 | Kneissl et al. |
| 2013/0163822 A1 | 6/2013 | Chigos et al. |
| 2014/0347511 A1* | 11/2014 | Rodriguez-Serrano ..................... |
| | | G06V 20/584 |
| | | 348/222.1 |
| 2015/0002732 A1 | 1/2015 | Hjelmstrom |
| 2015/0222812 A1 | 8/2015 | Murray et al. |
| 2015/0350510 A1 | 12/2015 | Han |
| 2016/0350601 A1 | 12/2016 | Grauer et al. |
| 2017/0041591 A1 | 2/2017 | Korogi et al. |
| 2017/0177963 A1 | 6/2017 | Pavelka et al. |
| 2017/0334340 A1 | 11/2017 | Madril et al. |
| 2018/0297511 A1 | 10/2018 | Park et al. |
| 2019/0004149 A1 | 1/2019 | Mano et al. |
| 2019/0129011 A1 | 5/2019 | Ruffo et al. |
| 2019/0315271 A1 | 10/2019 | Tatara et al. |
| 2020/0122645 A1* | 4/2020 | Tsai .................. H04N 5/42 |
| 2020/0348662 A1* | 11/2020 | Cella .................. H04W 52/246 |
| 2022/0067394 A1* | 3/2022 | Suksi ................. G06V 20/56 |

OTHER PUBLICATIONS

Sep. 11, 2020—(WO) International Search Report and Written Opinion—Appl No. PCT/US2020/030789, 16 pages.
Jun. 2, 2021—(WO) International Preliminary Report on Patentability—Appl No. PCT/US2020/030789, 6 pages.
Apr. 14, 2022—(US) Notice of Allowance—U.S. Appl. No. 17/607,286.
May 19, 2022—(EP) European Search Report—Appl No. PCT/US2020/030789.
D1 Cui Yuntao et al: "Extracting characters of license plates from video sequences", Machine Vision and Applications., vol. 10, No. 5-6, Apr. 1, 1998 (Apr. 1, 1998), pp. 308-320, XP055918011, DE ISSN: 0932-8092, DOI: 10.1007/s001380050081, Retrieved from the Internet: <URL:https://link.springer.com/content/pdf/10.1007/s001380050081.pdf>.
D2 Anonymous: "Image registration—Wikipedia", Mar. 6, 2019 (Mar. 6, 2019), XP055917810, Retrieved from the Internet: <URL:https://en.wikipedia.org/w/index.php?title=Image_registration&oldid=886389582> [retrieved on May 3, 2022].
D3 Anonymous: "Automatic number-plate recognition—Wikipedia", Apr. 29, 2019 (Apr. 29, 2019), XP055918268, Retrieved from the Internet: <URL:URL:https://en.wikipedia.org/w/index.php?title=Image_registration&oldid=886389582> [retrieved on May 4, 2022].
May 6, 2022—(EP) European Search Report of EP 20798459.

* cited by examiner

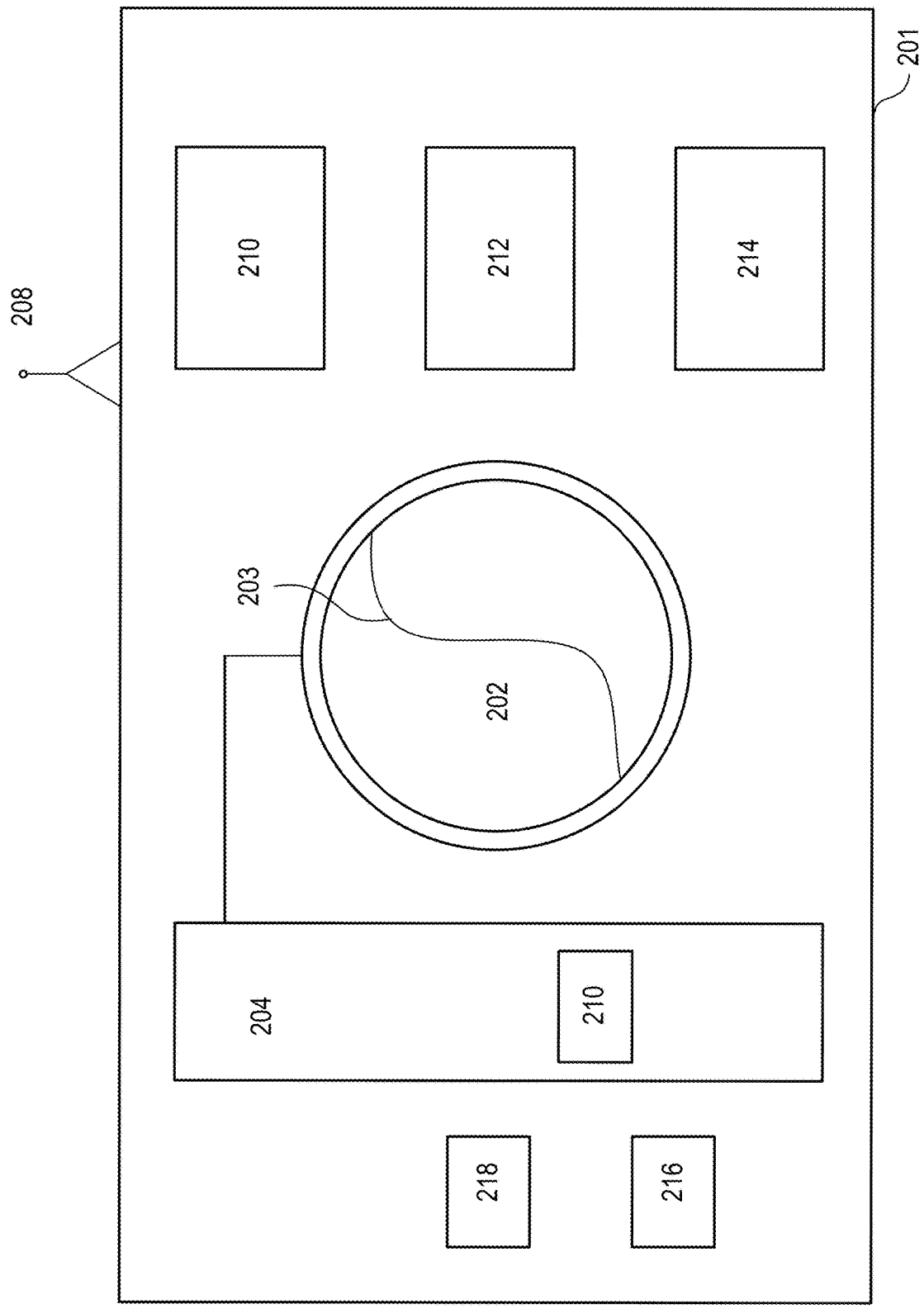

LICENSE PLATE READING SYSTEM WITH ENHANCEMENTS

CROSS-REFERENCE TO RELATED APPLICATIONS

This application is a continuation claiming the benefit of priority from U.S. patent application Ser. No. 17/607,286, filed Oct. 28, 2021, which is a U.S. national phase application under 35 USC 371 from PCT/US20/30789, filed Apr. 30, 2020, which claims the benefit of priority from all of three of: U.S. Provisional Patent Application Ser. No. 62/841,060, filed Apr. 30, 2019; U.S. patent application Ser. No. 16/399,607, filed Apr. 30, 2019; and U.S. patent application Ser. No. 16/399,654, filed Apr. 30, 2019. All of the aforementioned patent applications are herein incorporated by reference in their entireties.

BACKGROUND

Video and still cameras affixed to stationary structures are sometimes used for purposes of security surveillance. In a stationary installation, the camera is typically in an environment with known external variables (e.g., environmental, lighting, field of view) that are generally constant or readily apparent. In such an environment, basic cameras with minimal enhancements might suffice.

Meanwhile, in police cars, taxis, crowdsourced ride-sharing vehicles, and even personal vehicles, cameras mounted on a dashboard are sometimes used for purposes of recording the environment in the immediate proximity of the vehicle. However, in a vehicle moving at high speeds, the capabilities of a traditional camera to capture video and still images can sometimes be compromised. Moreover, external variables can sometimes further negatively impact the ability for the camera to capture sharp, useful images.

With respect to lighting conditions, some security cameras include features to improve recordability in low-light scenarios and night time. In the case of a stationary camera installation, a separate light source with a daylight sensor and/or clock setting might be installed in the area to illuminate in low-light scenarios or at night. Moreover, some separate light sources might emit light in the infrared spectrum range to enhance recordability at night without necessarily illuminating the environment with visible light. One problem is that in low light conditions, images of license plates tend to be very noisy, and it can be difficult/impossible to accurately detect the characters in a license plate. Long exposure times cannot be used to solve this problem because when the license plate is in motion, the captured image would be blurred.

Another problem is that incoming vehicle traffic and following vehicle traffic are both in motion, and likely with different speeds relative to a subject vehicle (i.e., the camera car). Thus, at a given exposure setting, some portions of a captured image may be higher quality than others, and these portions may vary from frame to frame. In addition, any angular motion relative to the subject vehicle might result in the license plate being captured in a shape other than a perfect rectangle. This further complicates the ability to recognize the characters in the license plate.

Yet another shortcoming is that incoming vehicle traffic and following vehicle traffic are moving at different speeds relative to a subject car (i.e., the camera car). And, a single camera cannot accurately capture both vehicles with a single exposure setting—historically, a single image sensor is unsuitable to simultaneously set two different exposure to capture them both.

Numerous novel and nonobvious features are disclosed herein for addressing one or more of the aforementioned shortcomings in the art.

BRIEF SUMMARY

In light of the foregoing background, the following presents a simplified summary of the present disclosure in order to provide a basic understanding of some aspects of the embodiments disclosed herein. This summary is not an extensive overview of the invention. It is not intended to identify key or critical elements of the invention or to delineate the scope of the invention. The following summary merely presents some concepts of the invention in a simplified form as a prelude to the more detailed description provided below.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect involves a license plate recognition (LPR) system attached to a law enforcement vehicle (or other vehicle). The LPR system may include a camera device including an image sensor, the camera device is configured to capture images including long-exposure images and short-exposure images with the image sensor, and the image sensor is configured to nearly simultaneously output a long-exposure image of a field of view and a short-exposure image of the same field of view. In other words, the same image may be captured, but with different exposure (or other) settings on the image sensor and/or camera device. The LPR system may also include a computer memory configured to store the images outputted by the image sensor, and a processor, which is communicatively coupled to the memory.

The processor may be programmed to perform steps of a method of an LPR system.

For example, the processor may receive, from the memory, a first long-exposure image and a first short-exposure image. The first long-exposure image may be captured with a first long-exposure setting of the camera device, and the first short-exposure image may be captured with a first short-exposure setting of the camera device. The processor of the LPR system may also detect a first license plate and a second license plate in the first long-exposure image, where the first license plate is in a first portion of the field of view and the second license plate is in a second portion of the field of view, and where the first portion of the field of view is different than the second portion of the field of view. The processor may also detect the first license plate and the second license plate in the first short-exposure image, where the first license plate is in the first portion of the field of view and the second license plate is in the second portion of the field of view. The LPR system may result in the characters of the second license plate having a greater probability of being recognized by a computerized optical character recognition platform in the first short-exposure image than in the first long-exposure image. In some embodiments, the LPR system may result in the characters of the first license plate have a greater probability of being recognized by a computerized optical character recognition platform in the first long-exposure image than in the first short-exposure image. Other embodiments of this aspect include corresponding computer systems, apparatus, and computer programs recorded on one or more computer storage devices, each configured to perform the actions of the methods.

Implementations may include one or more of the following features. The LPR system where the processor is further programmed to: calculate a relative speed of the second license plate using motion blur analysis of the second license plate in the first short-exposure image; capture, using the image sensor, a next short-exposure image with an exposure setting based on the calculated relative speed to reduce motion blur.

The LPR system may further include a controller communicatively connected to the camera device, where the controller is configured to adjust an exposure setting of the image sensor to affect the capture of the long-exposure images and the short-exposure images. Moreover, the processor may be further programmed to instruct the controller to adjust the first long-exposure setting and the first short-exposure setting of the camera device by an amount. The processor may also capture, using the image sensor, a second long-exposure image having a second long-exposure setting and a second short-exposure image having a second short-exposure setting. In addition, the processor may detect the first license plate and the second license plate in the second short-exposure image. The processor may also align the second license plate in the first short-exposure image with the second license plate in the second short-exposure image. The processor may then transform the second portion of each of the first short-exposure image and the second short-exposure image by geometrically rectifying to accommodate for relative positions of the second license plate. Then, merge at least the first short-exposure image and the second short-exposure image into a consolidated image. The result of the LPR system may be that characters of the second license plate have a greater probability of being recognized by the computerized optical character recognition platform in the consolidated image than the first short-exposure image, the second short-exposure image, the first long-exposure image, or the second long-exposure image. The LPR system may also include examples where the merging of images into a consolidated image includes merging additional short-exposure images from among the images captured by the LPR system, where the additional short-exposure images include the second license plate in the second portion of the field of view. The LPR system may result, in some examples, where characters of the first license plate have a greater probability of being recognized by a computerized optical character recognition (OCR) platform in the first long-exposure image than in the first short-exposure image. While the preceding examples refer to a first license plate or a second license plate, the contemplated embodiments are not so limited—e.g., a field of view may include more than two license plates and the accuracy of the OCRing may be different for each of the license plates based on various factors discussed herein, including but not limited to the relative speed of the vehicle onto which the license plate is affixed, varying lighting conditions at different spots in the field of view, dimensions and other characteristics (e.g., text color, background color, typeface, and the like) of the characters in the license plate, and other factors.

Implementations of the described techniques may include hardware, a method or process, or computer software on a computer-accessible medium. One general aspect includes LPR systems operating in a serial manner where the image sensor is nearly simultaneously outputting images of the field of view where the setting of the camera device is alternated every other frame from the long-exposure setting to the short-exposure setting, where the image sensor is a single image sensor. Meanwhile, another general aspect includes LPR systems operating in a parallel manner where the image sensor is nearly simultaneously outputting images of the field of view where the setting of the camera device is the long-exposure setting for a first set of lines in a frame while simultaneously to the short-exposure setting for a second set of lines in the same frame, where the first set of lines is different than the second set of lines. Another general aspect includes LPR systems operating where the image sensor includes a high dynamic range (HDR) sensor, and the HDR sensor is nearly simultaneously outputting images of the field of view includes separately outputting the long-exposure image and the short-exposure image without consolidating the long-exposure image and the short-exposure image into a single, consolidated image.

Another aspect includes LPR systems where the processor is further programmed to instruct a controller to adjust, for each of a plurality of images, at least one of a shutter speed setting, ISO setting, zoom setting, exposure setting, and/or other settings of the camera device such that a subsequent image is captured by the camera device with a different setting than that used to capture an immediately preceding image.

Another general aspect includes the LPR system where the processor includes an application specific integrated circuit (ASIC) processor, and the camera device is communicatively coupled to the processor by a wired connection. Other embodiments of this aspect include corresponding computer systems, apparatus, and computer programs recorded on one or more computer storage devices, each configured to perform the actions of the methods.

Yet another general aspect includes the LPR system where the camera device is a camera assembly further operating as an enclosure for the image sensor, controller, processor, and the memory arranged therein. In some embodiments, the camera device may include one or more of the aforementioned components. In other embodiments, the camera device may include an image sensor and associated electronic circuitry, but one or more of the other aforementioned components may be outside of the camera device but enclosed within a single camera assembly. In yet other embodiments, the camera device may include an image sensor and associated electronic circuitry, but one or more of the other aforementioned components may be outside of the camera device and communicatively coupled to the camera device through one or more interfaces and connections, e.g., a wired connection between a camera device mounted near a windshield of a vehicle and a processor, which may comprise a GPU, located in a trunk of the vehicle. Alternatives to the devices and components described herein are possible—e.g., individual modules/components or subsystems can be separated into additional modules/components or subsystems or combined into fewer modules/components or subsystems and may be interconnected through one or more interfaces and connections.

Also disclosed herein is a method involving one or more components of the license plate recognition (LPR) system disclosed herein. The LPR system may, in some examples, include a camera device with an image sensor (e.g., an HDR sensor or other sensor types), one or more processors, one or more computer memories, and/or a controller. The method may include steps to receive, by the processor from the memory, a first long-exposure image of a field of view captured by the image sensor with a long-exposure setting and a first short-exposure image of the same field of view captured by the image sensor with a short-exposure setting. In some examples, the short-exposure image and the long-exposure image are nearly simultaneously outputted by the image sensor. The method may further include a step to detect, by the processor, a first license plate and a second license plate in the first long-exposure image, where the first license plate is in a first portion of the field of view and the second license plate is in a second portion of the field of view. In some examples, the first portion of the field of view is different than the second portion of the field of view, as illustrated herein. The method may further detect, by the processor, the first license plate and the second license plate in the first short-exposure image, such that the characters of the first license plate have a greater probability of being recognized by a computerized optical character recognition platform in the first long-exposure image than in the first short-exposure image. Other embodiments of this aspect include corresponding computer systems, apparatus, and computer programs recorded on one or more computer storage devices, each configured to perform the actions of the methods.

Also disclosed herein is a tangible, non-transitory computer-readable medium or computer memory storing executable instructions that, when executed by a processor of a license plate recognition (LPR) system, cause the LPR system to perform one or more of the steps of the methods disclosed herein. In one example, the computer-readable medium may store executable instructions that, when executed by a processor of the LPR system, cause the LPR system to receive, from a memory of the LPR system, a first long-exposure image of a field of view, where the first long-exposure image is captured, using an image sensor, with a long-exposure setting of a camera device of the LPR system; receive, from a memory of the LPR system, a first short-exposure image of the same field of view, where the first short-exposure image is captured, using the image sensor, with a short-exposure setting of the camera device; detect a license plate in the first long-exposure image, where the license plate is in a first portion of the field of view; detect the license plate in the first short-exposure image, where the license plate is in the first portion of the field of view, where characters of the license plate have a greater probability of being recognized by a computerized optical character recognition platform in the first long-exposure image than in the first short-exposure image; instruct, a controller communicatively coupled to the processor and camera device, to adjust the long-exposure setting of the camera device by a first amount and to adjust the short-exposure setting of the camera device by a second amount, where the long-exposure setting and short-exposure setting include at least one of a shutter speed setting, ISO setting, zoom setting, and exposure setting of the camera device; capture, using the image sensor, a second long-exposure image with the adjusted long-exposure setting and a second short-exposure image with the adjusted short-exposure setting; detect the license plate in the second long-exposure image and the second short-exposure image; align the license plate in the first long-exposure image with the license plate in the second long-exposure image; transform the first portion of each of the first long-exposure image and the second long-exposure image by geometrically rectifying to accommodate for relative positions of the license plate; and merge at least the first long-exposure image and the second long-exposure image into a consolidated image, where characters of the license plate have a greater probability of being recognized by the computerized optical character recognition platform in the consolidated image than the first short-exposure image, the second short-exposure image, the first long-exposure image, or the second long-exposure image. Other embodiments of this aspect include corresponding computer systems, apparatus, and computer programs recorded on one or more computer storage devices, each configured to perform the actions of the methods. For example, in some examples the first amount and second amount are random amounts; in other examples, they are predetermined amounts, such as predefined values or values calculated based on a predetermined algorithm or formula; in yet other examples, one or more of the amounts may be based on a calculated relative speed of a target license plate using motion blur analysis of that license plate in a previously captured image, either with a long-exposure setting or short-exposure setting. Implementations of the described techniques may include hardware, a method or process, or computer software on a computer-accessible medium.

The methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a memory and a processor programmed to perform several operations. The memory may be configured to store image data (e.g., long-exposure images, short-exposure images, and other data) captured by a camera device attached to a police vehicle. The image data includes a first image of the target vehicle at a first time and a second image of the target vehicle at a second time. The processor, which is communicatively coupled to the memory, may be programmed to perform numerous operations.

For example, the processor may receive the first image from the memory, where the first image shows the target vehicle at a first position. Moreover, the processor may detect a license plate in the first image, where the license plate is in a first portion of the first image. In addition, the processor may receive the second image from the memory, where the second image shows the target vehicle at a second position that is different from the first position. Moreover, the processor may detect the license plate in the second image, where the license plate is in a second portion of the second image. In addition, the processor may align the license plate in the first portion and the license plate in the second portion. The processor also transforms the first portion and the second portion of the license plates by geometrically rectifying to accommodate for relative positions of the target vehicle at the first position and the second position. After the transforming, the processor may execute a temporal noise filter on the first portion of the first image and the second portion of the second image to generate a consolidated image, where the consolidated image has a higher probability that characters of the license plate in the consolidate image are recognized by a computerized optical character recognition platform than the license plate in the first image. Other embodiments of this aspect include corresponding computer systems, apparatus, and computer programs recorded on one or more computer storage devices, each configured to perform the actions of the methods.

Implementations may further include one or more of the following features. The system further including: a controller communicatively connected to the camera device, where the controller is configured to modify an exposure setting of the camera device; and where the processor is further programmed to: instruct the controller to adjust the various setting of the camera device on a periodic basis such that the second image is captured with a different camera setting than the first image. The various setting may include, but are not limited to, exposure setting, shutter speed, zoom setting, and other capture settings. The controller may adjust the settings of the camera device on a periodic basis, a regular basis, and/or based on other criteria, for example, based on the relative positions of the target vehicle at the first position and the second position.

In addition, implementations may further include one or more of the following features. The system where the processor includes an application-specific integrated circuit (ASIC) processor, and the camera device is communicatively coupled to the processor by a wired connection and/or a wireless connection. Or an implementation where the camera device is physically apart from the processor and is communicatively coupled to the processor with one of a wired and wireless connection. The system where the camera device further operates as an enclosure for the processor and the memory arranged therein.

Moreover, implementations may further include a system where the camera device omits any infrared illumination component. The system further including a location tracking device configured to stamp the first image with a first location of the police vehicle at the first time when the first image is captured by the camera device. The system further including a clock configured to timestamp the first image upon capture by the camera device. The system where the camera device attached to the police vehicle includes a plurality of cameras arranged at different locations of the police vehicle and configured to operate in a coordinated manner to capture the first image, and where at least one of the plurality of cameras includes an unmanned aerial vehicle equipped with video capture capabilities. The system including: a wireless circuitry configured to receive a command from an external system, where the command causes the license plate recognition system to capture the image data, where the external system includes at least one of a remote command center, another police vehicle, and a body-camera device. Implementations of the described techniques may include hardware, a method or process, or computer software on a computer-accessible medium.

One general aspect includes a method for recognizing a license plate of a target vehicle, the method including: receive, by a processor located at a police vehicle, a first image of a license plate of the target vehicle at a first time, where the target vehicle is at a first position; receive, by the processor, a second image of the license plate of the target vehicle at a second time, where the target vehicle is at a second portion that is different from the first position; align the license plate in the first image and the license plate in the second image; transform the first image and the second image to geometrically rectify the license plate to accommodate for relative positions of the target vehicle to the police vehicle; and execute a temporal noise filter on the first image and the second image to generate a consolidated image, where the consolidated image has a higher probability that characters of the license plate are recognized by a computerized optical character recognition platform than the license plate in the first image. Other embodiments of this aspect include corresponding computer systems, apparatus, and computer programs recorded on one or more computer storage devices, each configured to perform the actions of the methods.

Implementations may include one or more of the following features. The method including: detect, by a server communicatively coupled to the processor, a first boundary of the license plate in the first image; crop, by the server, the first image to discard outside of the first boundary of the first image; detect, by the server, a second boundary of the license plate in the second image; and crop, by the server, the second image to discard outside of the second boundary of the second image, where the server includes a chipset that uses artificial intelligence for detect operations. Implementations of the described techniques may include hardware, a method or process, or computer software on a computer-accessible medium.

One general aspect includes a tangible, non-transitory computer-readable medium storing executable instructions that, when executed by a processor of a license plate recognition system, cause the license plate recognition system to: receive, by the processor, a first image of a license plate of a target vehicle at a first time, where the target vehicle is at a first position when the first image is captured by a camera device; receive, by the processor, a second image of the license plate of the target vehicle at a second time, where the target vehicle is at a second portion that is different from the first position; detect, by the processor, a first boundary of the license plate in the first image; detect, by the processor, a second boundary of the license plate in the second image; align the license plate in the first image and the license plate in the second image; transform the first image and the second image to geometrically rectify the license plate to accommodate for relative positions of the target vehicle to the camera device; and execute a temporal noise filter on the first image and the second image to generate a consolidated image, where the consolidated image has a higher probability that characters of the license plate are recognized by a computerized optical character recognition platform than the license plate in the first image. Other embodiments of this aspect include corresponding computer systems, apparatus, and computer programs recorded on one or more computer storage devices, each configured to perform the actions of the methods.

The methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. In one example, a light emitting apparatus mountable to a transportation vehicle is disclosed where the apparatus includes a body and a camera. The light emitting apparatus also includes a light source including a plurality of light emitting diodes configured to emit light. The light emitting apparatus also includes a micro-controller communicatively coupled to the light source and the camera, where the micro-controller is configured to dynamically adjust at least illumination power of the light source and exposure time of the camera.

Implementations may include one or more of the following features. The apparatus where the light source is configured to emit light in an infrared frequency range. The apparatus where the dynamically adjusting of the illumination power of the light source and the exposure time of the camera occurs at a pre-defined interval of time. The apparatus where the dynamically adjusting of the illumination power of the light source and the exposure time of the camera occurs repeatedly through a range of combinations of illumination power and exposure times. The apparatus where the dynamically adjusting of the illumination power of the light source and the exposure time of the camera occurs repeatedly through a range of combinations of illumination power and exposure times without communicating with at least one of a distance measurement component and a speed delta measurement component. The apparatus where the distance measurement component and the speed measurement component include a processor and a memory that store a plurality of images captured with the camera, where the speed measurement component compares the plurality of captured images to determine a distance change over a period of time. Implementations of the described techniques may include hardware, a method or process, or computer software on a computer-accessible medium.

One general aspect includes a method for generating an enhanced illumination pattern from a light emitting apparatus mounted to a subject vehicle while it is traveling, the method including: measuring, by the light emitting apparatus, an approximate distance to a target vehicle in a lane near one on which the subject vehicle is traveling. The method also includes calculating, by the light emitting apparatus, a relative speed of the target vehicle in the lane relative to a speed of the subject vehicle in its own lane. The method also includes inputting the approximate distance to and the relative speed of the target vehicle into a micro-controller in the light emitting apparatus. The method also includes based on the received inputs, adjusting, by the micro-controller, one or more settings of a camera communicatively coupled to the light emitting apparatus. The method also includes based on the received inputs, sending, by the micro-controller, an illumination command to a light source in the light emitting apparatus corresponding to one of a low, medium, or high illumination. The method also includes sending a plurality of images captured by the camera while operating with different settings and under different illuminations to a processor for selection of an optimal image. Other embodiments of this aspect include corresponding computer systems, apparatus, and computer programs recorded on one or more computer storage devices, each configured to perform the actions of the methods.

Implementations may include one or more of the following features. The method where the one or more settings of the camera include shutter speed, ISO, auto-focus, and ultraviolet filter. The method where the light emitted by the light source is in an infrared frequency range. The method where the generating by micro-controller of the illumination command includes: outputting a medium value for the illumination command when the relative speed is below a threshold speed and the approximate distance is above a threshold distance. The method may also include outputting a medium value for the illumination command when the relative speed is above a threshold speed and the approximate distance is below a threshold distance. The method may also include outputting a high value for the illumination command when the relative speed is above a threshold speed and the approximate distance is above a threshold distance. The method may also include outputting a low value for the illumination command when the relative speed is below a threshold speed and the approximate distance is below a threshold distance. Implementations of the described techniques may include hardware, a method or process, or computer software on a computer-accessible medium.

One general aspect includes a light emitting apparatus mountable to a transportation vehicle, the apparatus including: a body. The light emitting apparatus also includes a camera. The light emitting apparatus also includes a light source including a plurality of light emitting diodes (LEDs) oriented in a grid pattern inside the body and configured to emit light in an infrared frequency range. The light emitting apparatus also includes a micro-controller communicatively coupled to the light source and the camera, where the micro-controller is configured to dynamically adjust at least illumination power of the light source and exposure time of the camera through a rotating list of combinations of illumination power and exposure times. The light emitting apparatus also includes where the light emitted by the plurality of LEDs creates an illumination pattern towards a lane near to the one on which the vehicle travels. Other embodiments of this aspect include corresponding computer systems, apparatus, and computer programs recorded on one or more computer storage devices, each configured to perform the actions of the methods.

The methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF FIGURES

The present invention is illustrated by way of example, and is not limited by, the accompanying figures in which like reference numerals indicate similar elements and in which:

FIG. 2A shows illustrative camera apparatuses with several technical components in accordance with one or more examples embodiments.

DETAILED DESCRIPTION

Figure 1A:
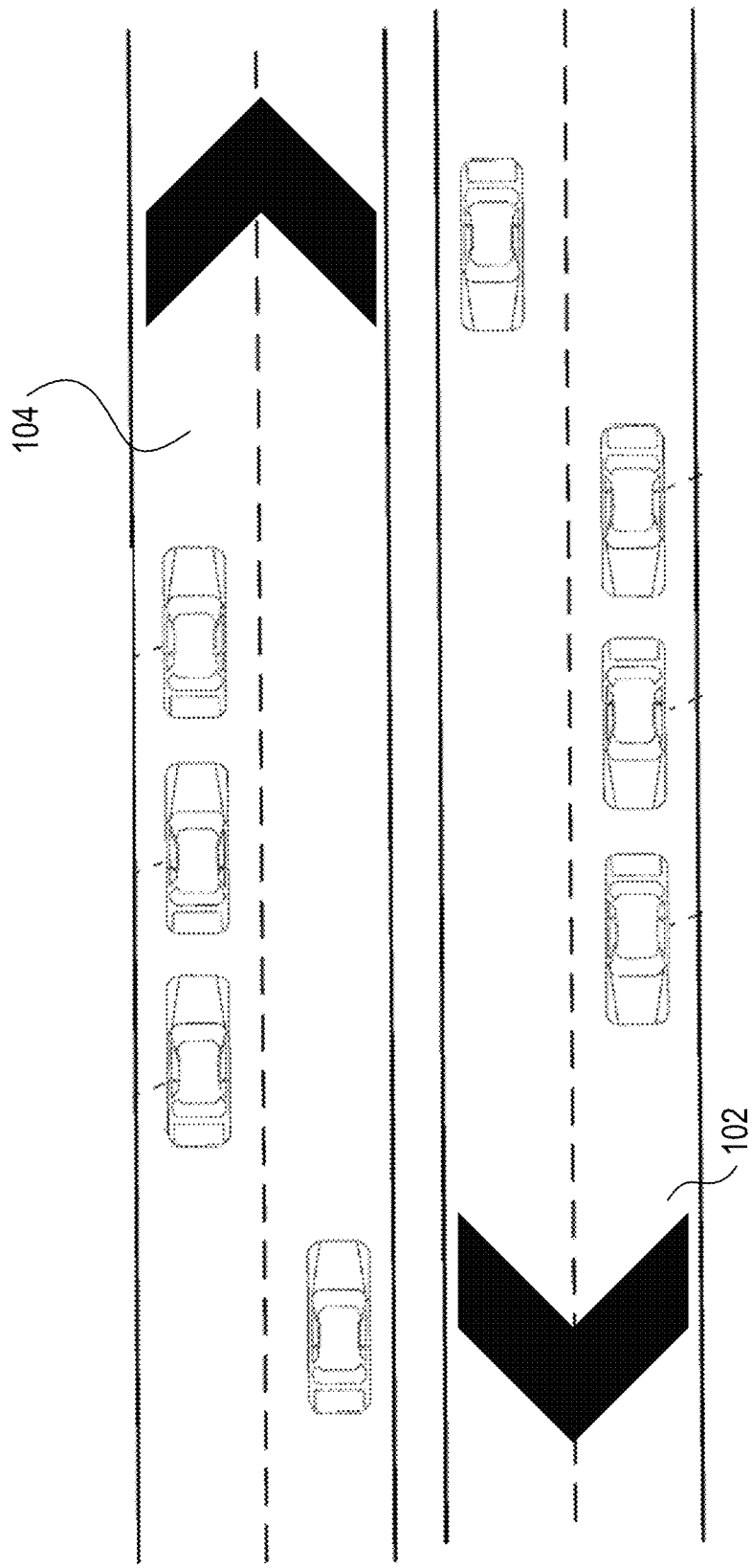
FIG. 1A and FIG. 1B illustrate an illustrative roadway on which subject vehicles and target vehicles may be traveling while the subject vehicle is operating in accordance with one or more example embodiments.

Generally, systems and methods are disclosed for capturing the license plate information of a vehicle in relative motion to a camera device. In one example, the camera device captures an image of the vehicle's license plate across multiple frames. The camera system detects the license plate in the multiple frames, then aligns and geometrically rectifies the image of the license plate by scaling, warping, rotating, and/or performing other functions on the images of the license plate. The camera system optimizes the capturing of the license plate information by executing a temporal noise filter (e.g., temporal noise reduction—TNR) on the aligned, geometrically rectified images to generate a composite image of the license plate for optical character recognition. In some examples, the camera device may include a high dynamic range (HDR) sensor that has been modified to set the long exposure and short exposure of the HDR sensor to capture an image of a vehicle's license plate, but without the HDR sensor consolidating the images into a composite image. The camera system may set optimal exposure settings based on detected relative speed of the vehicle or other criteria.

By way of example, and in no way limiting the features and contemplated combination of features disclosed herein, four illustrative use cases are described below describing particular aspects of disclosed features. In addition to the four use cases listed below, the disclosure contemplates many other examples, embodiments, implementations, and use cases that use combinations of the features and aspects described in the individual use cases. For example, one or more use cases describe a camera device positioned in/on the camera car and that is communicatively coupled to a processor in the automatic license place reading (ALPR) system by a wired connection and/or a wireless connection. The terms ALPR and LPR are used interchangeably in this disclosure. The use cases may also operate in an environment where the camera device is physically apart from the processor and is communicatively coupled to the processor with one of a wired and wireless connection. For example, in one example the camera device attached to the police vehicle includes a plurality of cameras arranged at different locations of the police vehicle and configured to operate in a coordinated manner to capture images of vehicle license plates or other items. Moreover, in some examples, at least one of the aforementioned plurality of cameras may include an unmanned aerial vehicle (UAV) equipped with video capture capabilities. The UAV may be mounted to the vehicle and may be automatically launched as appropriate by the LPR system upon occurrence of particular trigger events.

In addition, one or more embodiments include computerized methods, systems, devices, and apparatuses that capture images of one or more moving vehicles (i.e., a target vehicle) from another moving vehicle (i.e., subject vehicle). The disclosed system dynamically adjusts illumination power, exposure times, and/or other settings to optimize image capture that takes into account distance and speed. By optimizing for distances and moving vehicles, the disclosed system improves the probability of capturing a legible, usable photographic image. In one example, the disclosed system may be incorporated into an asymmetric license plate reading (ALPR) system. Aspects of the disclosed system improve over the art because, inter alia, it dynamically adjusts illumination power, exposure times, and/or other settings to optimize image capture that takes into account distance and speed. In one example, the disclosed system may be incorporated into an asymmetric license plate reading (ALPR) system. For example, by optimizing for distances and moving vehicles—the disclosed system improves the probability of capturing a legible, usable photographic image of a target vehicle's license plate (or other information such as an image of a driver and/or passengers in a vehicle). Moreover, aspects of the disclosed system improve the camera's ability to capture objects and license plates at farther distances (e.g., more than 20-30 feet away) than existing technology.

Regarding FIG. 1A, in practice, target vehicles (e.g., oncoming traffic) on a roadway 102 traveling in a direction opposite to a subject vehicle on the roadway 104 may be traveling at different speeds and be at different distances. Meanwhile, the continuous flow of new target vehicles on the roadway 102 (e.g., oncoming traffic and following traffic) adds complexity to image capture. The optimum value for camera settings for each scenario is a non-linear function which depends on the camera performance parameters and detection algorithms, and may provide images of sufficient quality to capture objects and license plate numbers. In scenarios such as FIG. 1, which corresponds to roadways in countries like Britain and India, the oncoming traffic is on the right-hand side lane; thus, the configuration set for the implementation would be reversed for those countries.

Figure 2B:
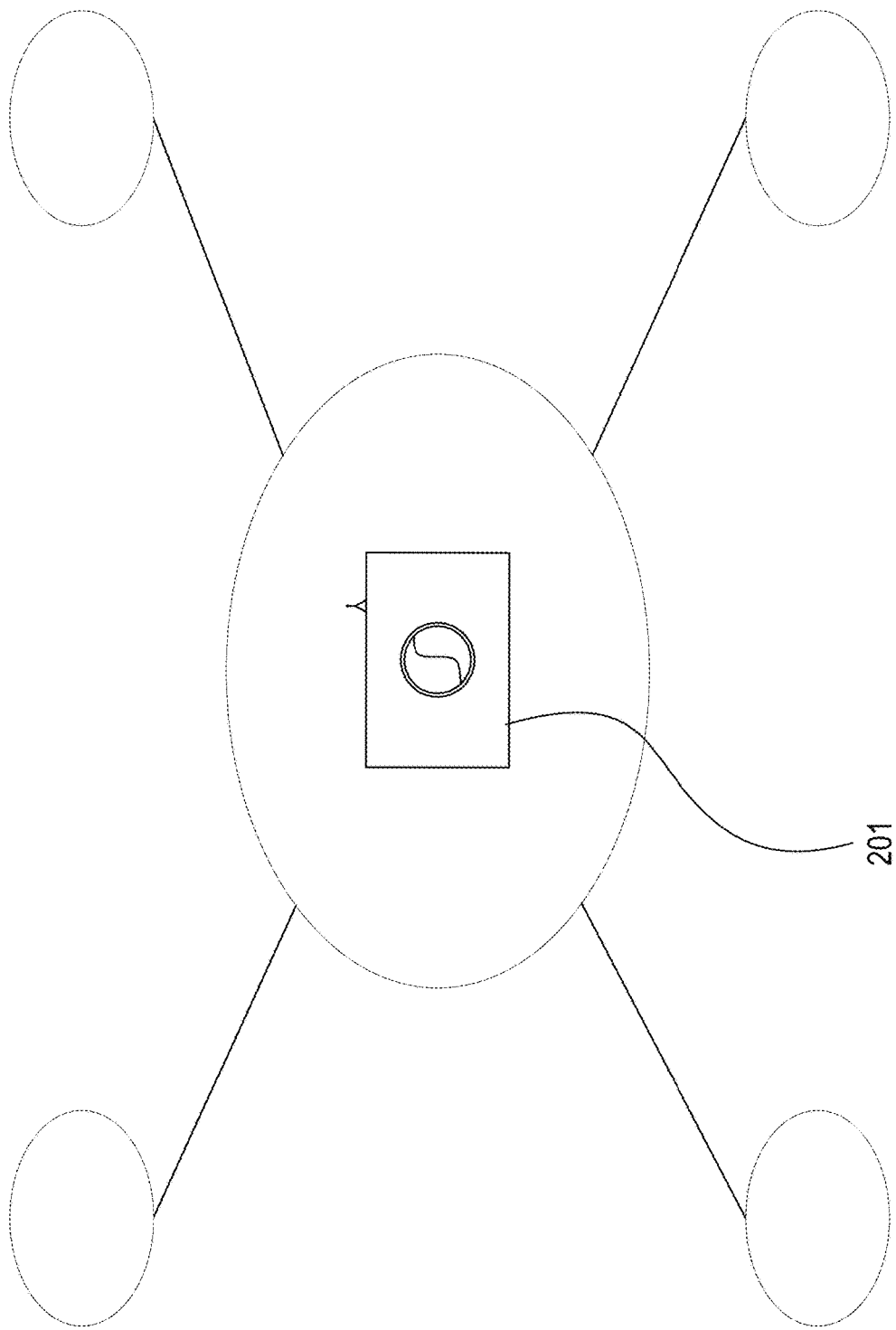
FIG. 2B is an example of implementations of the camera assembly in accordance with one or more example embodiments.
Figure 2C:
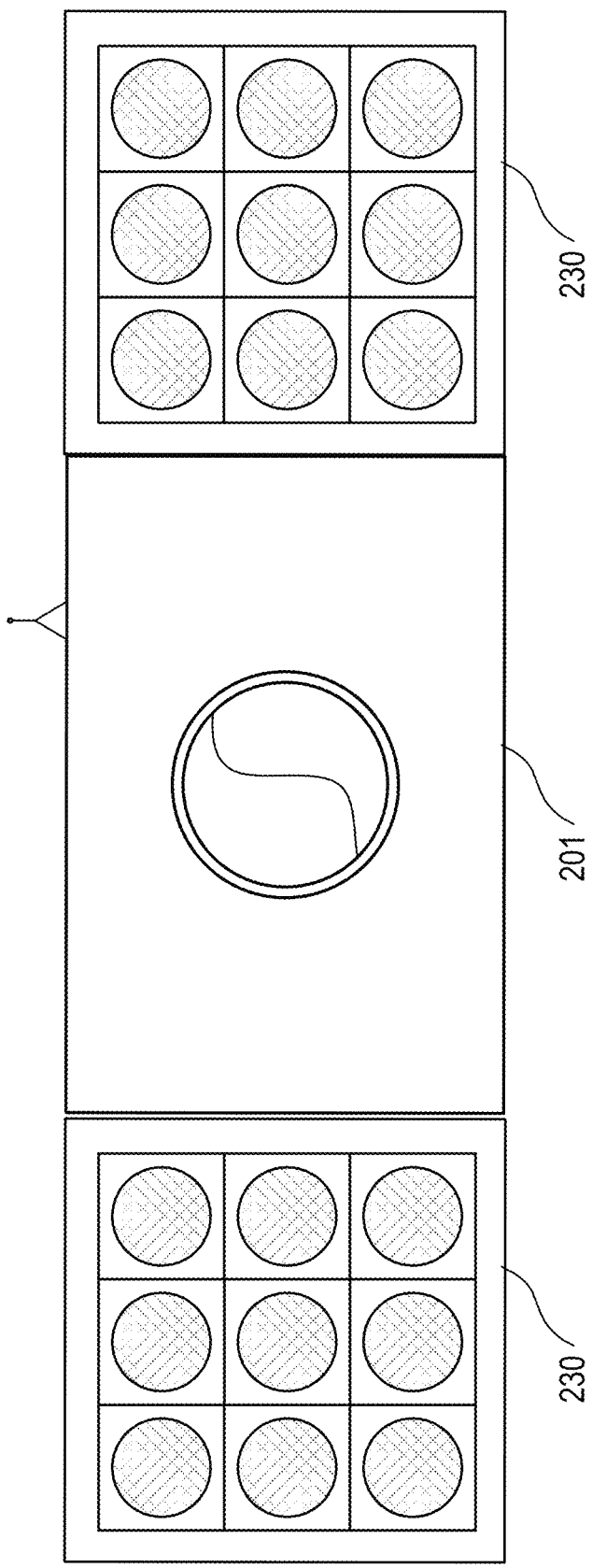
FIG. 2C is an illustrative light emitting apparatus in accordance with one or more example embodiments.
Figure 2D:
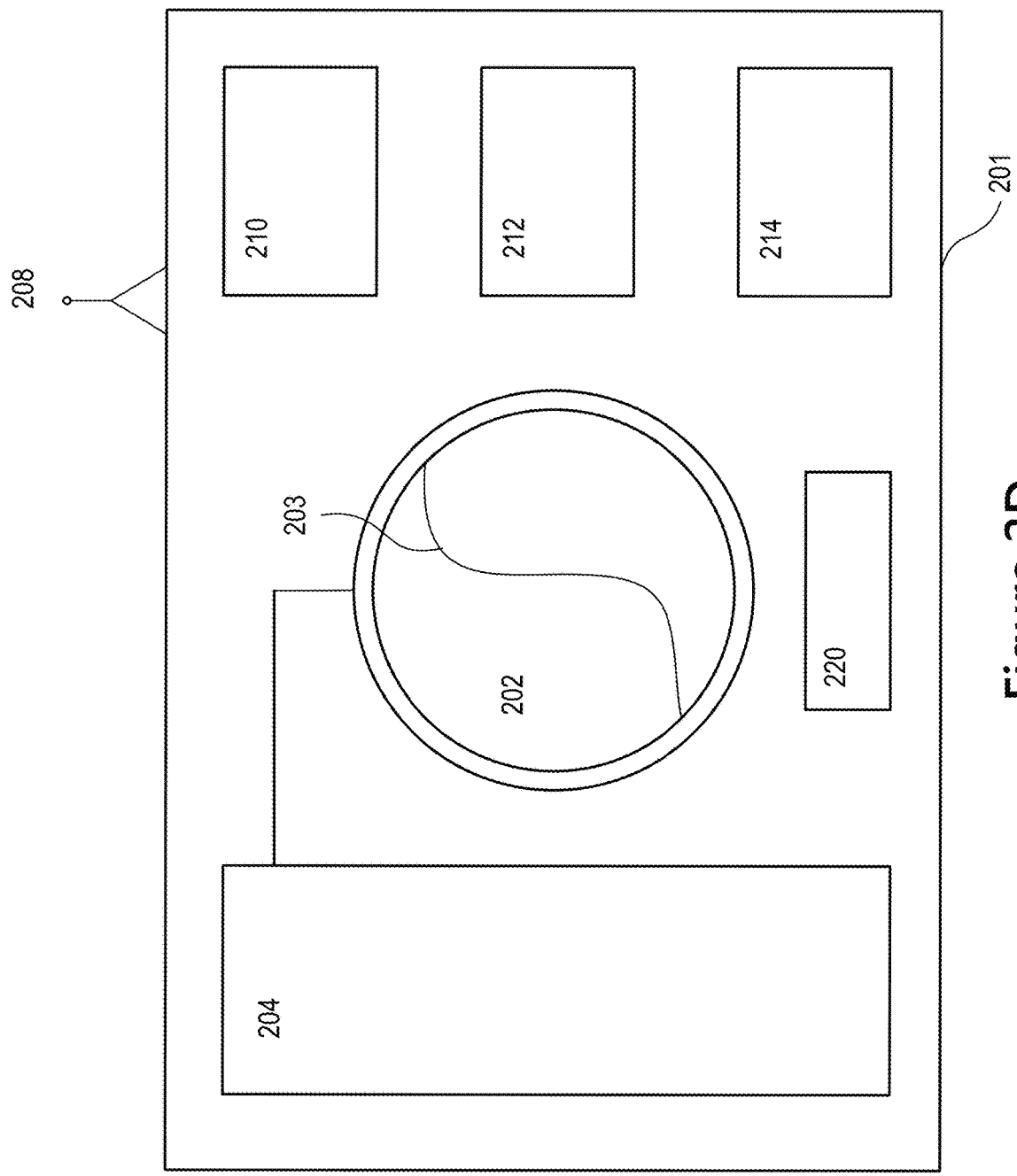
FIG. 2D shows illustrative camera apparatuses with several technical components in accordance with one or more examples embodiments.

FIG. 2D illustrates a camera apparatus enhanced with various aspects of the disclosed systems. The camera apparatus 201 may include one or more components to assist in enhancing image capture of a license plate of a moving, target vehicle. In particular, a micro-controller 204 may be incorporated with the camera apparatus 201 to automatically adjust settings. The micro-controller 204 may adjust settings such as, but not limited to, exposure time, (optionally) illumination power, focus position, sensor gain (camera ISO speed), aperture size, filters (e.g., ultraviolet—UV), image-noise filtering, and the like.

Figure 15:
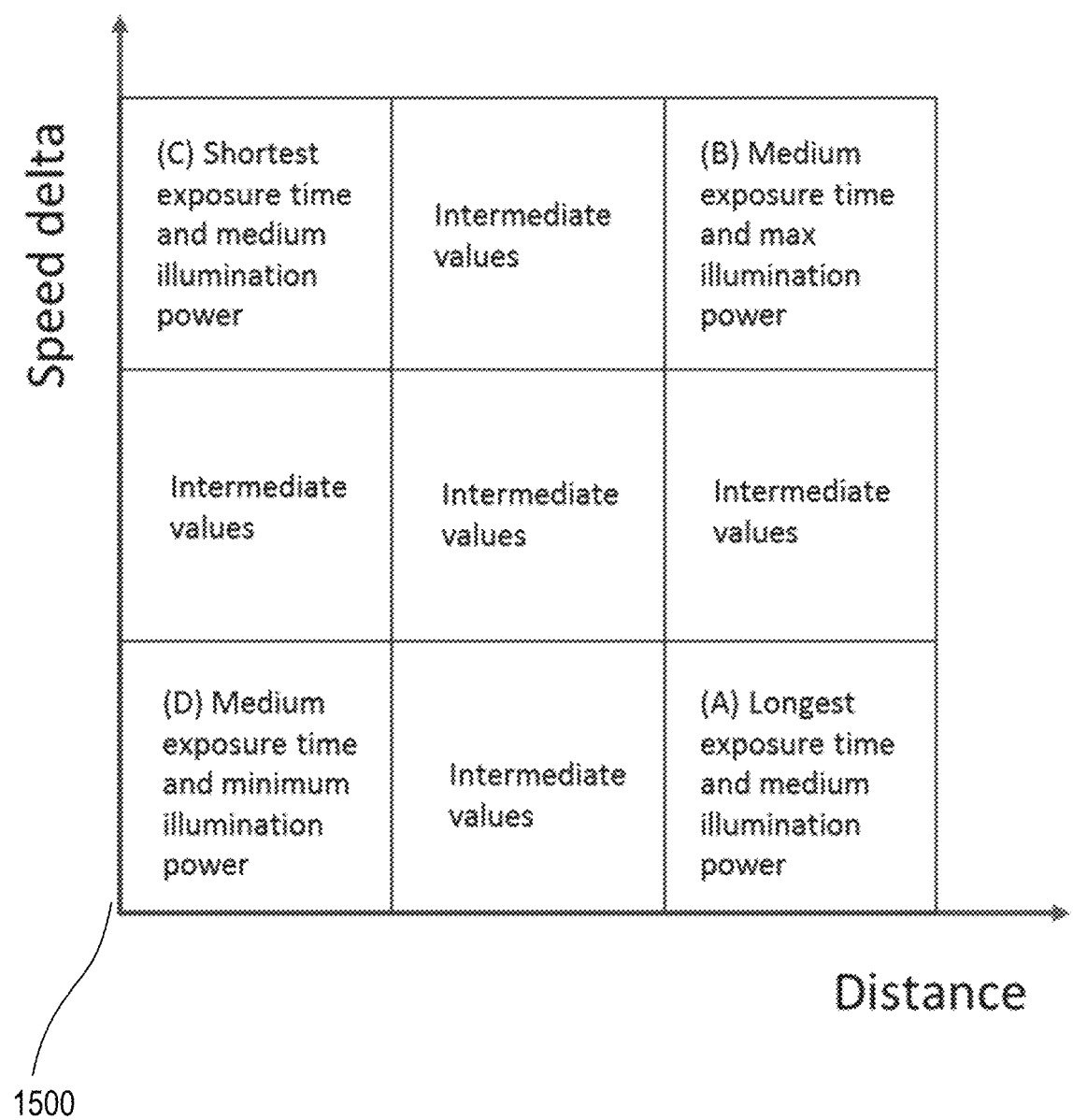
FIG. 15 depicts illustrative operational settings based on a relationship between speed delta and distance in accordance with one or more examples embodiments.

Elaborating upon the examples provided with the aid of FIG. 15 with respect to asymmetric illumination to enhance license place recognition, the micro-controller 204 may receive inputs of speed delta and distance, and adjust the settings of exposure time and/or illumination power according to various scenarios 1500 identified. For example, in scenario (A) in the lower right-corner of the graph 1500, the target vehicles with small speed delta (compared to the subject vehicle) but with maximum recognition distance, cause the micro-controller 204 to set the camera to use the longest exposure times and/or medium illumination power. The longer exposure time is optimal because the angular movement is minimized due to long distance and small speed delta. Due to the long-exposure time, the illumination power does not need to be the highest possible, even when the target vehicle is at far distance. Example values are 4 millisecond and 0.5 W illumination power, respectively.

With reference to FIG. 15, in another example, in scenario B in the upper right-corner of the graph 1500, the target vehicle is at a long distance with large speed delta need medium exposure time because the speed delta pushes it shorter, but long distance pushes it longer. These target vehicles need the highest illumination power available to compensate for the shorter exposure time compared to scenario A. The micro-controller 204 may also increase gain, in some examples, than in scenario A if the illumination power reserve is running out. Example values are 2 millisecond and 1 W illumination power, respectively.

With reference to FIG. 15, in yet another example, in scenario C in the upper left-corner of the graph 1500, the target vehicle is at a short distance and a high speed delta creates the highest angular speed in the camera view. Therefore, the micro-controller 204 sets the exposure time to be very short, (e.g., only 0.1 milliseconds). As a result, the shutter covering the image sensor 202 may open for only a very short time. As the target vehicles are close in distance and the power of the illumination is proportional to the inverse of the distance squared, the illumination power can be in the medium level, such as 0.25 W illumination power.

With reference to FIG. 15, in another example, in scenario D in the lower left-corner of the graph 1500, the target vehicle is at a short distance with a small speed delta. Thus, the micro-controller 204 sets a medium exposure time, similar to its operation in scenario B. The illumination power can also be set to a minimum due to the short distance (similar to scenario C), but longer exposure time, e.g., 0.05 W. Coincidentally, static LED illumination cone optimization (see FIG. 1B) supports this behaviour—vehicles expected to need lower illumination (e.g., scenarios A and D) have a lower power illumination cone.

Referring to FIG. 2D, in some examples, the camera apparatus 201 may be integrated with a light source 220 for emitting infrared light, or light in a different frequency spectrum. In alternate embodiments, a light emitting apparatus 230 may be physically separate from the camera apparatus 201. In such embodiments, the micro-controller 204 in the camera apparatus communicates with the micro-controller in the light emitting apparatus 230. For example, if the camera apparatus 201 is equipped with components to detect and measure the delta speed value and distance value of a target vehicle, then its micro-controller 204 may share this information with the light emitting apparatus 230 for efficiency. The apparatuses may share information wirelessly using antenna and wireless circuitry 208. The wireless circuitry 208 may support high-speed short-range communication to permit fast communication between the apparatuses. The wireless circuitry 208 may also include long-range communication hardware to permit connection to a remote server computer or cloud devices.

In addition to efficiency, the sharing of information between the devices furthers the synchronization of the apparatuses 201, 230 for purposes of capturing a higher quality image. For example, if the camera apparatus 201 relies on the light emitting apparatus 230 to provide a pulse of infrared light at the moment of, or just immediately prior to, the shutter 203 on the camera apparatus 201 opening, the two apparatus must communication and synchronize. In one example, to aid in synchronization, inter alia, the camera assembly may operate a pre-defined sequence of configuration settings at pre-defined intervals. The system may cycle through a set of scenarios (e.g., scenarios A-D in FIG. 15) to test the quality of image capture with each scenario. Meanwhile, multiple settings may be used without requiring the separate apparatus to synchronize each time—rather, the separate apparatus might synchronize just at the start of the pre-defined script. Once the script begins execution, each apparatus performs its part to completion.

Light source 220 (or light emitting apparatus 230) provides functionality to the overall system because it provides the illumination pattern for improving image capture quality. As such, the synchronization or alignment of the light emitting apparatus 230 and the camera apparatus 201 is important. In one example, an LED pulse and camera exposure time are aligned to capture numerous images with varying configuration settings. For example, first, the micro-controller 204 uses the most powerful LED pulse available and longer exposure time. This is good for catching target vehicles at longer distances (because a lot of light is needed and also the angular velocity is smaller so the longer exposure time is acceptable). Then on the next frame, the micro-controller 204 uses medium exposure time and illumination pulse power. This is useful for catching target vehicles at medium distances. Next, the micro-controller 204 may set a very short exposure time and also the lowest power LED pulse to catch the closest vehicles. Then the cycle may start again with the longest exposure time and highest pulse power. By adjusting both the exposure time and pulse power, the system is optimized for "inversely proportional to the square of the distance" characteristics of these systems. The illumination intensity is inversely proportional to the square of distance between the light source and target vehicle's license plate. This makes the exposure very difficult—if the target car is slightly too far away, the license plate may be too dark to see, and if the car is slightly too close, the license plate may be too bright to see (i.e., overexposed).

Referring to FIG. 2D, the camera apparatus 201 may also include memory 210, a global positioning system (GPS) unit 212, and a processor 214. The memory 210 is a suitable device configured to store data for access by a processor, controller, or other computer component. A memory stores information. A memory may provide previously stored information responsive to a request for information. A memory may store information in any conventional format. A memory may store electronic digital information. A memory may provide stored data as digital information. A memory includes any semiconductor, magnetic, optical technology, or combination thereof for storing information. A memory may receive information from a processing circuit for storage. A processing circuit may provide a memory a request for previously stored information. Responsive to the request the memory may provide stored information to a processing circuit. A memory may include any circuitry for storing program instructions and/or data. Storage may be organized in any conventional manner (e.g., program code, buffer, circular buffer). Memory may be incorporated in and/or accessible by a transmitter, a receiver, a transceiver, a sensor, a controller, and a processing circuit (e.g., processors, sequential logic). A memory may perform the functions of a data store and/or a computer-readable medium. The memory 210 may include non-volatile memory (e.g., flash memory), volatile memory (e.g. random-access memory—RAM), or a hybrid form of computer-readable medium for data storage. Moreover, the memory 210 may include one or more cache memories for high-speed access.

In various embodiments, processor 214 may comprise any circuitry, electrical components, electronic components, software, and/or the like configured to perform various operations and functions discussed herein. For example, processor 214 may comprise a processing circuit, a processor, a digital signal processor, a microcontroller, a microprocessor, an application-specific integrated circuit (ASIC), a programmable logic device, logic circuitry, state machines, micro-electromechanical system (MEMS) devices, signal conditioning circuitry, communication circuitry, a computer, a computer-based system, a radio, a network appliance, a data bus, an address bus, and/or any combination thereof. In various embodiments, processor 214 may include passive electronic devices (e.g., resistors, capacitors, inductors, etc.) and/or active electronic devices (e.g., op amps, comparators, analog-to-digital converters, digital-to-analog converters, programmable logic, sample rate converters (SRCs), transistors, etc.). In various embodiments, processor 214 may include data buses, output ports, input ports, timers, memory, arithmetic units, and/or the like.

In rapid operation, a camera apparatus 201 may capture multiple images in a matter of seconds. Multiple levels of cache memory may be used to ensure efficient execution. The memory 210 may closely operate with the processor 214. For example, the processor may include an image processor to analyze images captured by the apparatus 201 to determine if the image is sufficiently legible or insufficiently legible. The image processor may analyze images to determine whether to retain the image data, or immediately discard the image data. At least one benefit of an image processor operating nearly simultaneously with image capture is reduced memory usage due to immediate discarding of useless or empty images.

In one example of technological efficiencies of the system, the image captured by the image sensor 202 may be stored in memory 210 and then sent to processor 214 to detect the vehicle license plate number of the target vehicle in the image. The vehicle license plate number may then be compared against a database of license plate numbers (or other information) associated with possible legal-related issues. In some embodiments, the vehicle license plate number (and other information) may be sent over a network to a remote server in the cloud that stores a database of license plate numbers. If a concern is identified, the operator of the subject vehicle may be alerted audibly, visually, or through haptic feedback (e.g., vibrations).

In addition, the camera apparatus 201 may include a GPS unit 212 to capture the location of the camera apparatus 201 at the instant an image is captured. In addition to location, the GPS unit or other component in the camera apparatus may timestamp the capture of the image. Location and time data may then be embedded, or otherwise securely integrated, into the image (e.g., metadata of the image) to authenticate the capture of the photograph. Once the image is securely stamped with location and date/time, the image may, in some example, be securely transmitted to a cloud server for storage. In some examples, the image may be stored in an evidence management system provided as a cloud-based service.

In addition to location-stamping the image, the GPS unit 212 may also be used to enhance image capture. In one example, the speed of the subject vehicle may be obtained from the GPS unit 212 or from the on-board diagnostics (OBD) port of the subject vehicle. The vehicle speed and/or the positional data (e.g., longitude-latitude data) from the GPS unit 212, may allow the micro-controller to predict whether the subject vehicle is on a rural highway or other street. The speed of the subject vehicle effects the quality of the images captured because the angular velocity for close target vehicles will be too high. Therefore, the system becomes trained about which settings are optimal for the scenario. For example, the GPS unit 212 may detect if the subject vehicle is traveling in a city, suburb, or rural area, and adjust the settings in adherence.

In addition to location-stamping the image, the GPS unit 212 may also be used to enhance image capture. In one example, the system may remember particular configuration settings at a particular geographic location, and the micro-controller 304 may re-use the prior ideal configuration settings at that location. For example, a particular stretch of highway might have an impenetrable row of trees that renders the system futile for a duration of time. During that time, the system may halt image capture if the system is primarily being used in an ALPR application. Rather than collect image data and consume limited memory 210 on the camera apparatus 201, the system uses historical data to learn and improve the operation of the system with a feedback loop.

Figure 5:
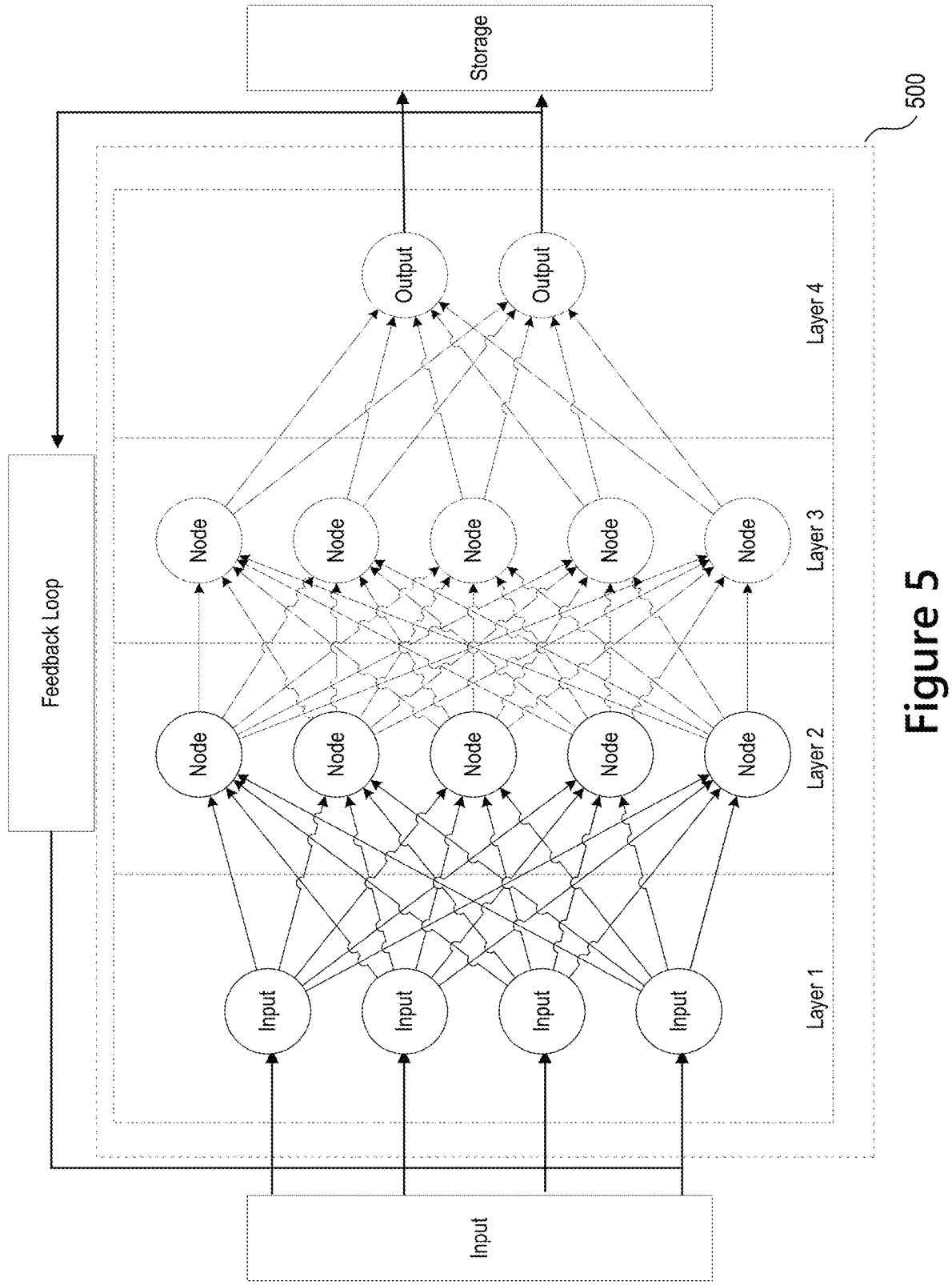
FIG. 5 illustrates an example of artificial intelligence methods that may be implemented in accordance with one or more example embodiments.

Referring to FIG. 2A, the camera apparatus 201 may include and/or omit one or more components in some embodiments. For example, the light source 220 may be omitted in some embodiments of the camera apparatus 201. Instead, the light emitting apparatus may be external to the camera apparatus 201 and operate in a synchronized manner with the camera apparatus 201. Furthermore, the camera apparatus 201 may include additional components 218, such as a stabilizer, optical zoom hardware, cache memory, interface to a vehicle's on-board diagnostics (OBD) port, multi-axis accelerometer, a motion sensor, and components 216 configured to use artificial intelligence (AI) to perform operations. For example, an AI model may be trained and stored in memory on the camera apparatus 201 to assist the AI component 216 to use a feedback loop to adjust and refine its settings and operation. The AI component 216 may include a graphics processing unit (GPU) for processing machine learning and deep learning calculations with efficiency and speed. As illustrated in FIG. 5, a neural network 500 executing in the GPU can provide valuable feedback as the system is trained with real image captures.

Furthermore, in a networked, crowdsourced arrangement, the camera assembly system may be installed on multiple subject vehicles operating in a particular geographic area to provide broader coverage. The plurality of camera apparatuses on different vehicles may cooperate with each other by sharing information over a wireless connection. The camera apparatus in a first subject vehicle may be operated in conjunction with global satellites or other location tracking systems. A second subject vehicle with a camera assembly system may share information either directly with, or via a cloud server, the first subject vehicle. The sharing of information may allow the training of the AI component 216 with greater efficiency.

Although several of the examples with reference to FIGS. 2A and 2D have mentioned illumination with a light source 220, not all implementations of the camera apparatus (i.e., camera device) need to include such a component. For example, with respect to an LPR system that captures vehicle license plates using multi-exposure capture and/or temporal noise filtering (TNF), one or more of the components in the camera device 201 may be present, but not necessarily all components. For example, an LPR system may efficiently capture images in low lighting conditions without a light source 220 or light apparatus 230.

Figure 3:
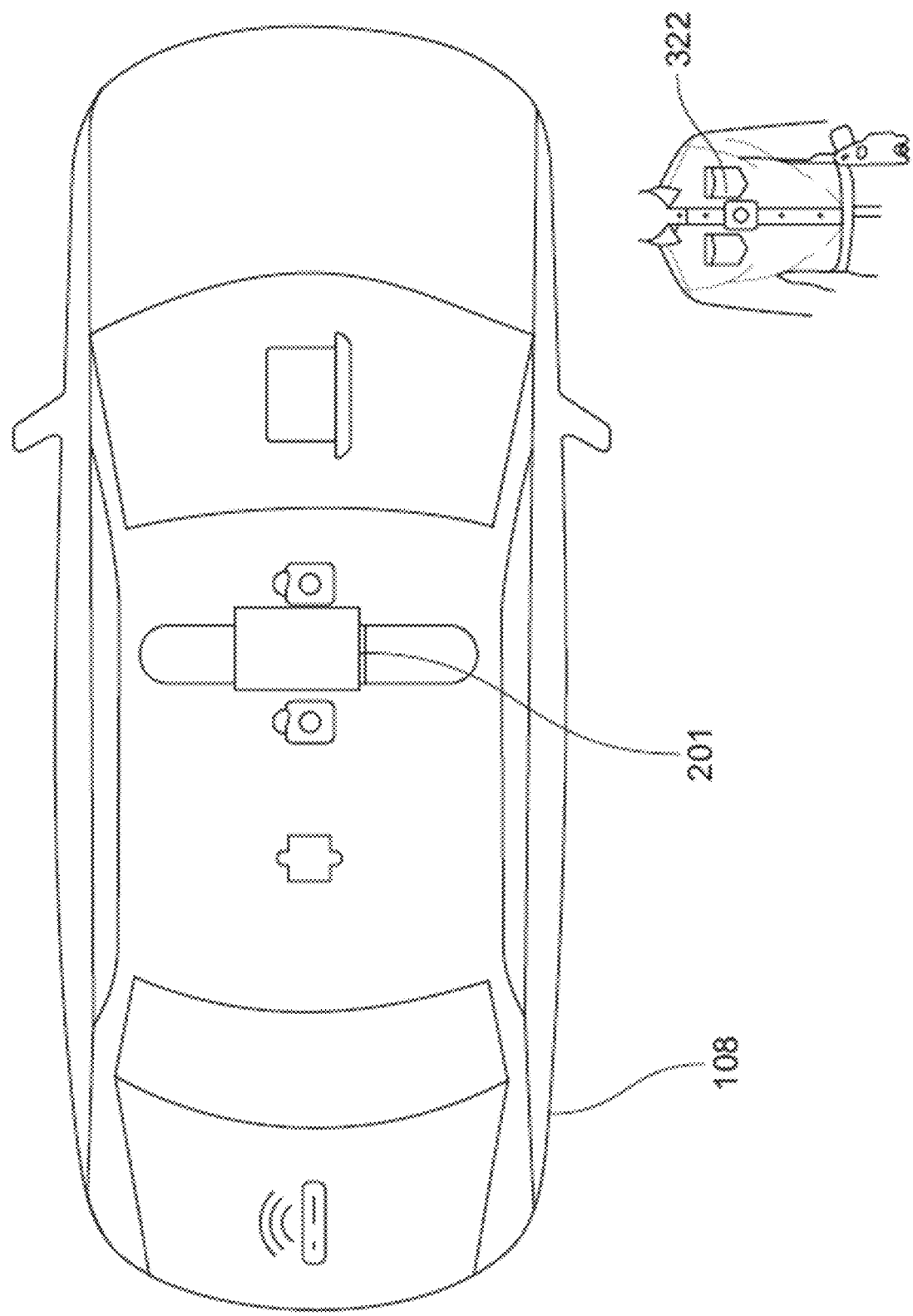
FIG. 3 is an example of implementations of the camera assembly in accordance with one or more example embodiments.
Figure 4:
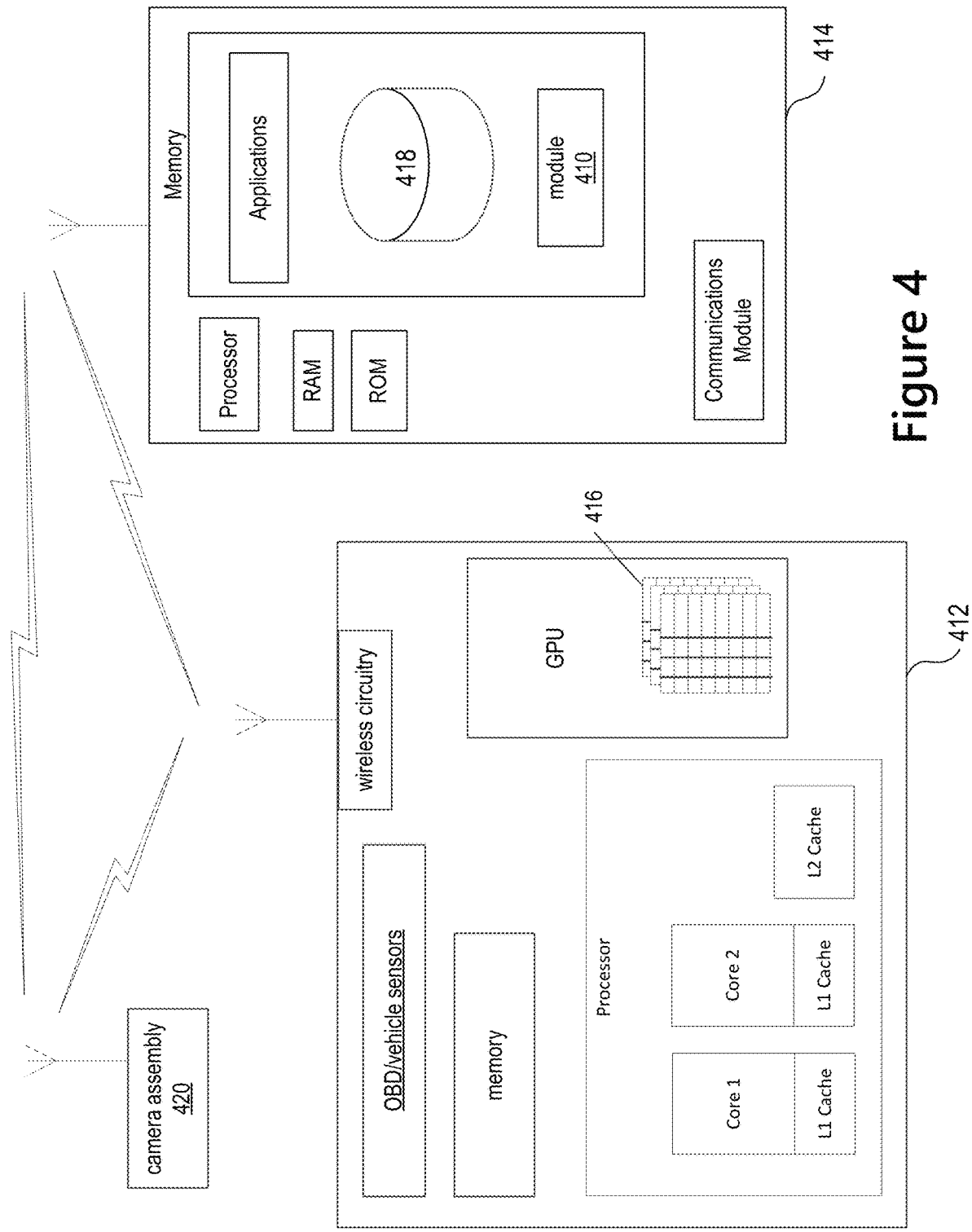
FIG. 4 illustrates an example of a networked environment for implementation of one or more aspects of the disclosure in accordance with one or more example embodiments.

Regarding FIG. 4, in one or more arrangements, teachings of the present disclosure may be implemented with system of networked computing devices. FIG. 4 illustrates that the camera assembly 201 may operate with other networked computing devices 412, 414. In addition to the device shown in FIG. 4, other accessories and devices may be communicatively coupled to the camera assembly 201. For example, an operator (as illustrated in FIG. 3), such as a law enforcement officer, may be associated with one or more devices 322. The devices may include, but are not limited to, a wearable camera, a weapon 322, and various devices associated with a vehicle 108, such as a vehicle-mounted camera 201. The weapon 322 may be, for example, a conducted energy weapon (CEW) that transmits notifications regarding events such as firing events, cartridge loading, holster removal, and/or the like. Other devices, such as a heart rate sensor device, a holster sensor device, and/or the like may also be included in the system but are not illustrated in FIG. 4.

The system includes an evidence management system 414 having a digital video and audio processing system with an audio watermark processing engine, such as the digital video and audio processing system. The digital video and audio processing system may be configured to receive and process audio watermarks, and may also include a synchronization engine. Some of the devices in FIG. 4 may have limited communication functionality. For example, devices may have short-range wireless communication abilities, but some devices may only be able to perform a direct long-range transmission or reception of information, such as to an evidence management system 414, when physically connected to an evidence collection dock that communicates with the evidence management system 414 via a network such as a local area network (LAN), a wide area network (WAN), and/or the Internet.

In some embodiments, a computing device 412 is provided at the vehicle 108. The computing device 412 may be a laptop computing device, a tablet computing device, or any other suitable computing device capable of performing actions described herein. The computing device 412 may be capable of short-range communication with the devices in the system, and may also be capable of long range communication with the evidence management system 414, a dispatch system, or any other system. In some embodiments, the computing device 412 has the components and capabilities described herein.

Communication between devices 201, 412, 414 may include any conventional technologies (e.g., cellular phone service, text and data messaging, email, voice over IP, push-to-talk, video over cellular, video over IP, and/or the like). Communication may use conventional public or private media (e.g., public cellular phone service, local area service, reserved channels, private trunk service, emergency services radio bands, and/or the like). In some embodiments, the device 412 may be configured to perform computationally intensive operations as an edge computing device, thus reducing the load on and bandwidth to remote device 414.

Computing device 412 may be located in or around a subject vehicle. The computing device 412 may communicate with an on-board diagnostics (OBD) port of the subject vehicle to collect information about speed and other properties of the subject vehicle. In some examples, the device 412 may communicate wirelessly with vehicle sensors positioned in the subject vehicle. The data collected about the subject vehicle may be stored in association with images captured by the camera assembly 201.

Computing device 412 may include a GPU for performing machine learning (ML) computations using training data 416 collected by the camera assembly 201 and other camera assemblies mounted on other vehicles. Through the collection of this data, the neural network 500 illustrated in FIG. 5 provides feedback to the system to improve performance.

FIG. 5 illustrates a neural network 500 that may be executed by module 410 in device 414, including providing other artificial intelligence computations. At least one advantage of the module 410 being located in the cloud is that edge-computing resources may be conserved for other computations. Examples of edge-computing resources in the system include component 216 in the camera apparatus 201. For example, an AI model may be trained and stored in memory on the camera apparatus 201 to assist the AI component 216 to use a feedback loop to adjust and refine its settings and operation. The AI component 216 may include a GPU for processing machine learning and deep learning calculations with efficiency and speed. For example, the deep learning systems 500 may analyze and categorize video based on its fundamental sensory components: what's visually present (sight) and what's happening across time (motion). Examples of motion include the way objects move across time to derive deeper meaning from the scene. For example, the deep learning can determine if an object is stationary or moving, what direction it's moving, and how the scene evolves around it.

FIG. 5 may further include a prediction subsystem for using model data to train the neural network 500 to predict whether an image will be optimal with particular camera parameter settings and illumination cone pattern settings. It should be noted that, while one or more operations are described herein as being performed by particular components, those operations may, in some embodiments, be performed by other components or by other devices in the system. In addition, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments). In some embodiments, techniques used by the machine learning models (or other prediction models) include clustering, principal component analysis, nearest neighbors, and other techniques. Training of machine learning models (or other prediction models) may include supervised or unsupervised training.

In some embodiments, a neural network may be trained and utilized for predicting optimal setting configurations. As an example, neural networks may be based on a large collection of neural units (or artificial neurons). In some embodiments, each individual neural unit may have a summation function which combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "Layer 1" neural units. In some embodiments, stimulation and inhibition for neural networks may be more free-flowing, with connections interacting in a more chaotic and complex fashion.

Referring to FIG. 3, in some embodiments, the camera apparatus is a mountable camera that provides a point of view associated with the subject vehicle. In some embodiments, the camera apparatus may be modified to be a device carried by the user, such as mounted onto a helmet. In one example (see FIG. 3), the camera assembly 201 may automatically start, pause, stop, etc. based on events received via a short-range wireless interface with the vehicle sensors of vehicle 108. For example, if a subject vehicle 108 is standing still at rest, the vehicle's speed delta may register at a lower value. As such, referring to the scenarios 1500 in FIG. 15, the camera apparatus 201 may adjust its settings configuration via the micro-controller to accommodate the environment. Meanwhile, the memory 210 store may also store event information in association with captured images to record conditions at the time of image capture. This information may be useful when auditing data for potential use in a legal proceeding.

Moreover, connecting with a local network may provide the device 201 with event notifications, such as when the operator opens the car door, activates a police car's light/siren bar, and other events, so the device 201 can react accordingly. For example, the LPR system may automatically turn ON or OFF the camera device based on the law enforcement vehicle's status—e.g., if siren alarm is ON, if siren lights are ON, if the vehicle is driving at high speeds, whenever movement is detected. In addition, one or more features disclosed herein may be, in some appropriate examples, embodied in a bodycam worn on a police officer. In such embodiments, the functionality may be purposefully culled to accommodate a smaller battery. It may also be embodied in a drone (UAV) or other mobile device. An external system may send a command to the processor of the LPR system to cause the processor to activate and capture the first image, then the second and subsequent images. In some examples, the external system may comprise at least one of a remote command center, another police vehicle, and/or a body-camera device. Meanwhile, when multiple vehicle license plates are detected in a single image capture, the LPR system might attempt to simultaneously perform the operations for each of the plates.

Regarding the subject vehicle, it may be a police patrol car, but can be any road or off-road vehicle (or even flying vehicle), including jeeps, trucks, motorcycles, ambulances, buses, recreational vehicles, fire engines, drones, and the like. The target one or more vehicles can likewise be any combination of any types of vehicles, and will be in the proximity of the subject vehicle in any of numerous different placements. Some of the target vehicles will have rear license plates, front license plates, or both front and rear plates.

Regarding mounting locations, one or more cameras may be mounted at the front and/or rear portions of the subject vehicle. Mounting can be on the bumpers or anywhere else, and can even be located in other positions such as in the siren tower on top of the subject vehicle or inside the cab behind the windshield. The one or more cameras can be mounted in the center line of the subject vehicle, or off-center in any suitable manner. The one or more cameras may be mounted above the American Standard 1 (AS1) line of a windshield so as to not obscure a a vehicle operator's view through the windshield. The at least one camera provides front, rear, side, and/or a combination of coverage. A second, third, or more other cameras may optionally be included on the subject vehicle. In some embodiments, a plurality of cameras may be mounted on the subject vehicle in suitable locations (e.g., front, rear, side, or top) to allow up to 360 degrees of field of view for image capture. Moreover, the camera assembly may be programmed to operate autonomously in background mode, e.g., without requiring operator input. The camera assembly may, in some embodiments, only alert the operator when the camera assembly has identified a possible safety (or legal-related) concern, for example, using the captured license plate information of neighboring vehicles. The camera assembly may, in some embodiments, operate continuously for an extended period of time while the subject vehicle is patrolling an area, and can be turned on and off by the operator as desired.

Figure 12:
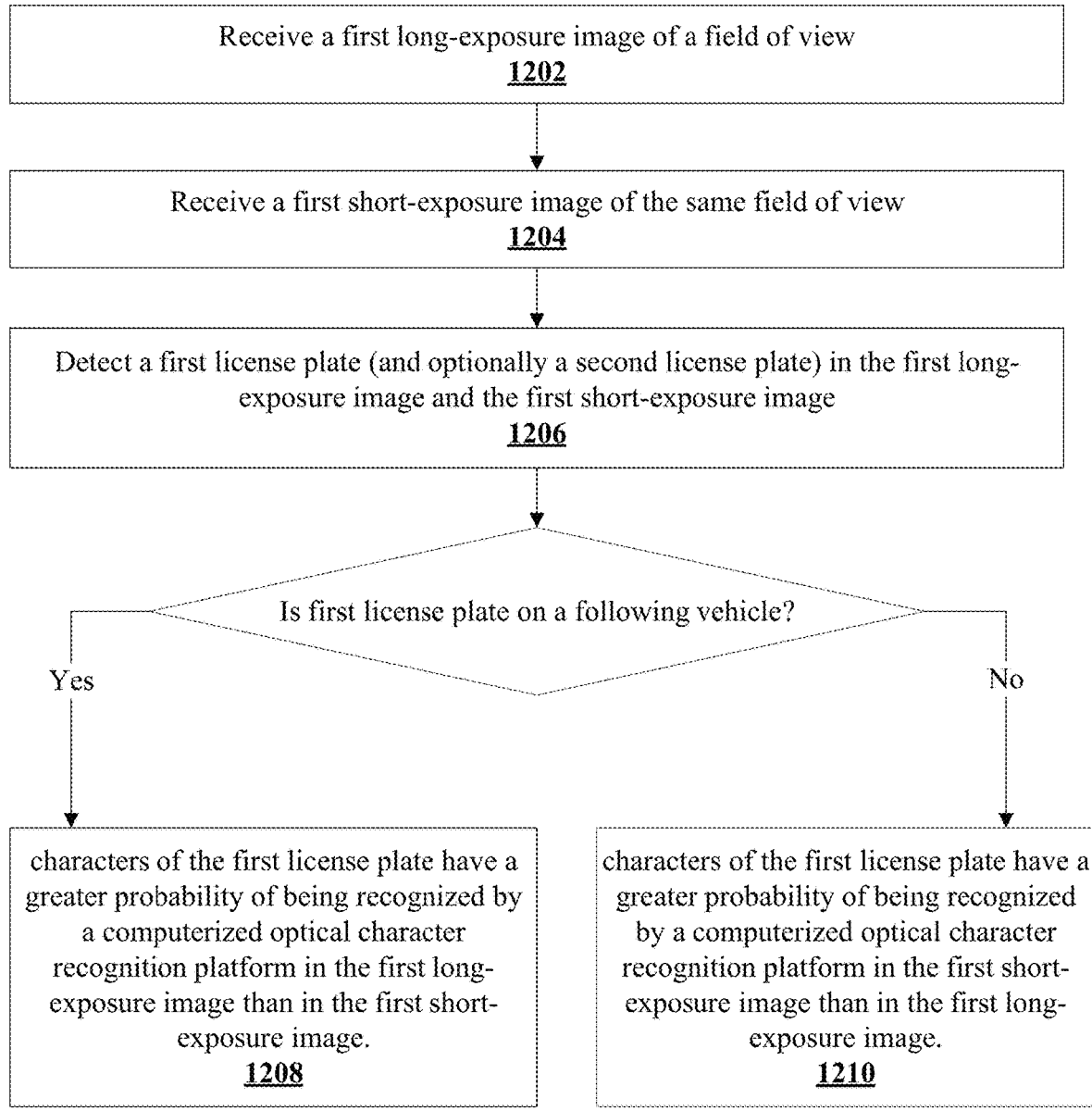
FIG. 12 is a flowchart in accordance with one or more examples of multi-exposure capture with an LPR system.

Referring to FIG. 12, the first of several use cases describe one illustrative image sensor (e.g., an HDR sensor) being used in a relatively static scene that operates using HDR (and/or HDR-like) features of a camera device of an LPR system that is installed in or on a vehicle (or other non-stationary/mobile device). In some embodiments, the image sensor may be installed at a fixed location, such as a light post, building exterior, etc. In one example, the image streams outputted by the HDR sensor are modified to keep the outputted image streams separate. An HDR sensor can generate two or more video streams with different exposure times from a single image sensor. This can be done by the sensor HDR mode. For example, a first set of images may be captured by the camera device using its image sensor, and that first set of images may comprise a first long-exposure time image and a first short exposure time image. The LPR system then receives (in step 1202) the long-exposure image and also receives (in step 1204) the short-exposure image. In normal HDR mode, however, the long and short exposures are combined. In this example, however, the LPR system maintains separate streams. The long and short streams use different exposure times for different frames in the video stream. In other words, the image sensor captures images, but keeps the long-exposure and short-exposure image streams separate—i.e., the frames are not consolidated the typical way that HDR mode operates. There is a greater likelihood of accurate OCR of a license plate of a target vehicle with greater relative speed in the short-exposure image.

In some embodiments, no speed detection (e.g., no relative speed of the license plate in the image is determined) or consideration is performed by the LPR system, thus no steps are taken to further optimize the exposure setting(s) of the HDR sensor for each stream. In other examples, speed detection or consideration is performed by the LPR system, and steps are taken to further optimize the exposure setting(s) of the HDR sensor for each stream. In one embodiment, the long-exposure setting and short-exposure setting of the image sensor may each be adjusted (e.g., based on detected relative speeds or by a predetermined amount), and a second, subsequent pair of images are captured. The subsequent pair of images may comprise a second long-exposure time image and a second short-exposure time image. There is a greater likelihood of accurate OCR of the target vehicle with greater relative speed in the short-exposure image. Moreover, when the image sensor's short-exposure setting is refined/adjusted to account for relative speeds, the accuracy of the OCR may further improve. Below is one illustrative HDR use case involving the technical components and method steps disclosed herein. Although an HDR sensor is mentioned in various examples, the examples are not so limited—any image sensor with the desired capabilities described herein may be substituted for the HDR sensor.

In particular, in low light scenarios, an LPR system may face difficulty in accurately recognizing license plate characters due to insufficient lighting. To improve the exposure, the camera ISO can be increased, or the shutter speed can be reduced (i.e., exposure time is increased). However, with increased ISO comes increased noise, which can reduce OCR performance. Additionally, with slower shutter speeds (i.e., longer exposure times), images may become blurred. This problem is exacerbated when the relative speed between the camera-equipped vehicle and the target vehicle is high, such as in the case of oncoming traffic. Therefore, in this use case, with a single camera with a single field of view, the image sensor captures two streams of data—one stream having exposure settings optimized for low relative speed traffic (e.g., same direction traffic) and the other stream optimized for high relative speed traffic (e.g., oncoming traffic), as explained in more detail herein.

In an initial step, the LPR system may use one or more object detection libraries to find an object in a captured image that matches the characteristics of a license plate. The library takes a captured image as input and identifies a license plate in the image using object detection. In one embodiment, a heat map of likelihood of a license plate being in the image may be done. In one example, this likelihood (e.g., probability/confidence score) may be done by an artificial intelligence (AI) model trained from image data.

Figure 10:
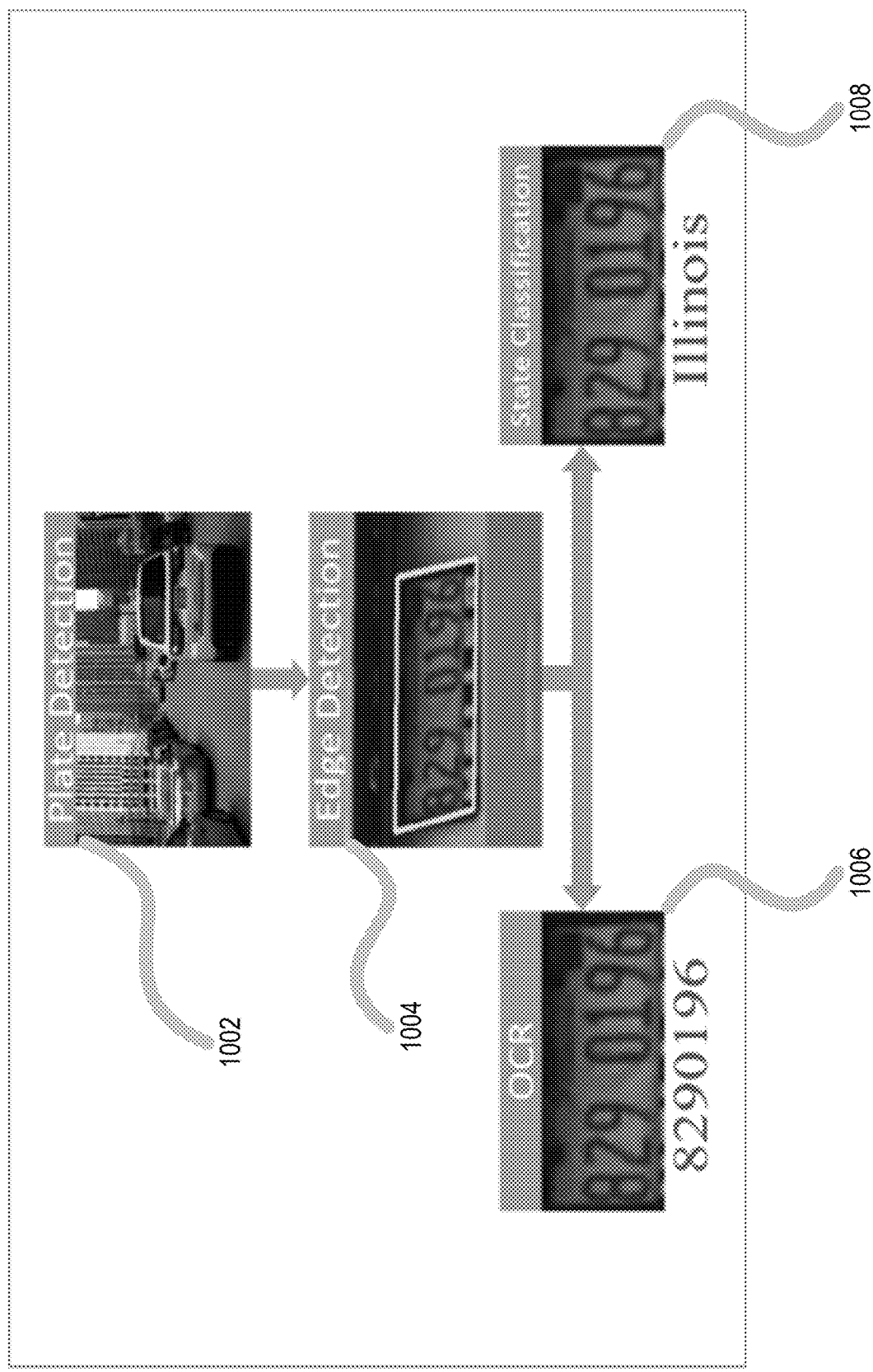
FIG. 10 illustrates edge detection in accordance with one or more example embodiments.

Next, a processor in the LPR system may use one or more object tracking libraries to detect what appears to be the same license plate in one or more subsequently captured images. In one example, the LPR system may use a boundary of (e.g., bounding box around) the license plate to track its position across frames. FIG. 10 illustrates how an edge detection module in the object tracking library may detect and track a parallelogram boundary shape 1004 around a license plate. In step 1206 of FIG. 12, the LPR system detects one or more license plates in the stream of frames with long-exposure and/or short-exposure.

Figure 6A:
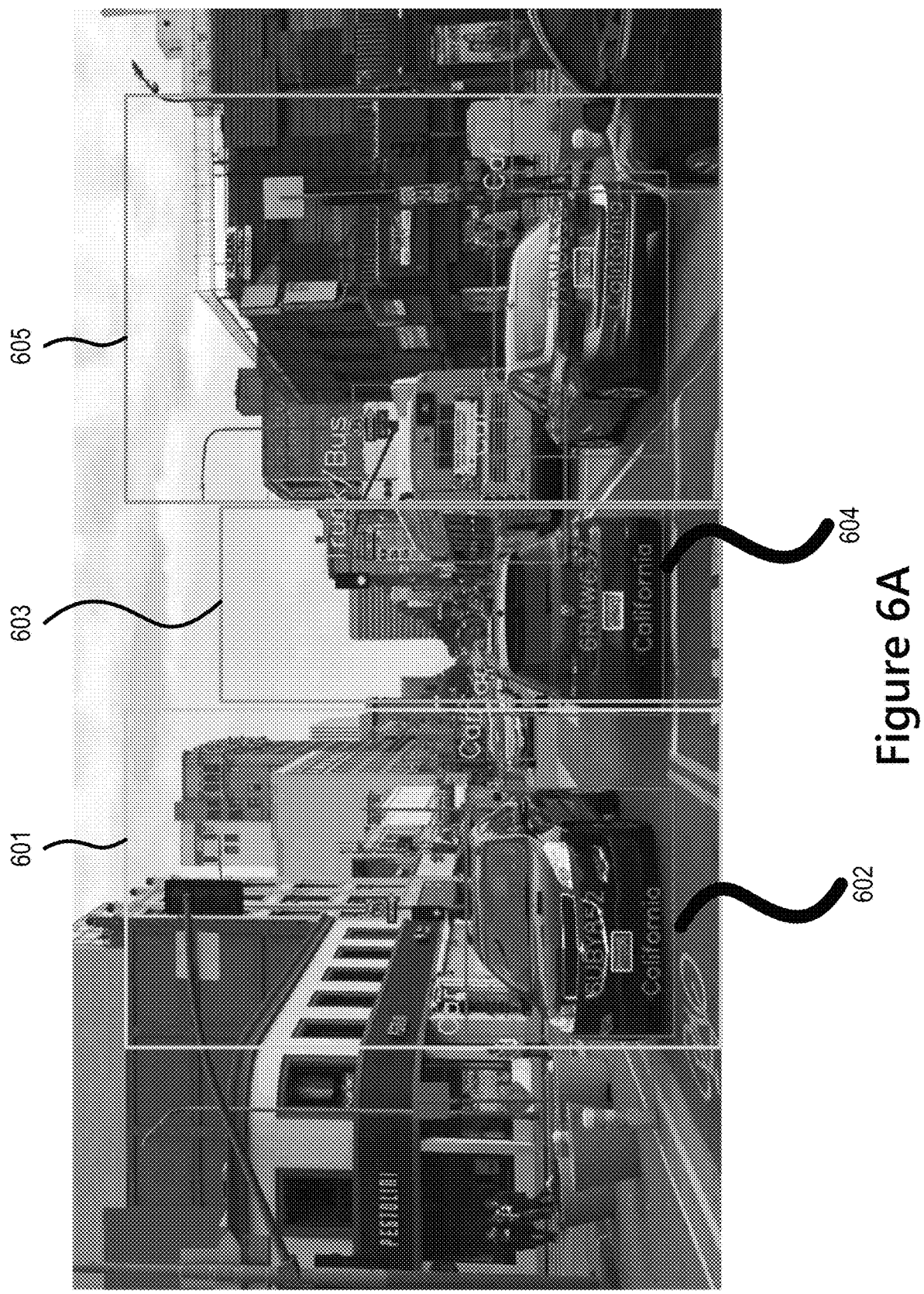
FIG. 6A is a photograph of a street with following traffic and oncoming traffic in accordance with one or more example embodiments.

Referring to FIG. 6A, an output is depicted of the object detection and object tracking libraries, after analysis by the LPR system. Oncoming vehicle 602, following vehicle 604, and other vehicles are detected and identified in FIG. 6A. Box 601 shows portions of the image with oncoming traffic, and box 603 and box 605 show portions of the image with following traffic. The number of boxes may correspond with a number of lanes of traffic—both oncoming traffic and following traffic. Of course, FIG. 6A represents a later-generated output of the LPR system once the steps described below have been performed and an optical character recognition (OCR) has been completed of the resulting image data. FIG. 6A illustrates the capabilities of the object detection and object tracking libraries to detect the characteristics/attributes of a license plate. The object detection and object tracking libraries may be further trained to detect characteristics of a license plate based on its known position on the front of a vehicle or the rear of a vehicle. For example, characteristics of a license plate may include, but are not limited to, detection of a rectangular shape located on a vehicle containing a horizontal arrangement of alphanumeric characters and/or with a state name located in pre-defined position within the rectangular shape. After performance of this step in this first use case, the LPR system may have just the bounding boxes around suspected license plates in the image—the object tracking and OCRing have not yet occurred.

In the next step, multiple subsequent images are captured. The LPR system may cause its camera device to randomly/periodically adjust exposure settings of long exposure and short exposure on the HDR sensor to attempt to capture a sharper/higher quality image. The exposure settings might be adjusted based on one or more other inputs for example, a daylight sensor or a clock mechanism to determine when a low-light condition exists and adjusting exposure settings based on lighting conditions. In some examples, the properties of the capturing camera device could be adjusted automatically or dynamically—e.g., based on a series rotation or random cycling through a pre-defined set of settings.

In one example involving low-light conditions, an LPR system may further include a camera device that includes an (optional) infrared illumination component 230, as illustrated in FIG. 2D. However, the LPR system described herein may be designed to alternatively operate without the assistance of an infrared illumination component. For example, one problem with prior art LPR systems was that in low light conditions, license plate images tended to be very noisy, and it was difficult/impossible to accurately detect the characters in an image of a license plate. Moreover, long exposure times were inadequate to fully solve this problem because when the vehicles are in motion, the captured image risked being blurred. However, with the LPR system disclosed herein, the method steps and arrangement of components disclosed herein overcome the shortcoming in prior art LPR systems. Nevertheless, the disclosed LPR system may also operate without detriment in combination with an (optional) illumination system.

To achieve higher success with legible license plate capture, the LPR system may cause its camera device to adjust exposure settings of long exposure and short exposure on the HDR sensor. The settings of the camera device in the LPR system may be adjusted using a controller communicatively connected to the camera device. The controller may be configured to modify a setting of the camera device. The various camera device settings may include, but are not limited to, exposure time setting, shutter speed, zoom setting (optical or non-optical zoom), illumination power, focus position, sensor gain (e.g., camera ISO speed), aperture size, filters, other capture settings, and the like. A person of skill in the art will appreciate after review of the entirety disclosed herein that one or more of the settings may be interrelated or dependent. For example, an exposure of ½₅ sec at f/11, ISO 100 is equivalent to an exposure of ¹⁄₄₀₀ sec at f/2.8, ISO 100. In other words, because the shutter speed has been reduced by four stops, this means less light is being captured by the image sensor in the camera assembly. As a result, the aperture is increased in size by four stops to allow more light into the camera assembly to maintain constant exposure. While there are benefits and disadvantages to adjusting the settings in one way versus another, such knowledge would fall within the realm of a person having skill in the art. For example, a person having skill in the art would understand that to maximize exposure, a camera assembly might be set to a large aperture, 6400 ISO, and a slow shutter speed. Meanwhile, to minimize exposure, a camera assembly would be set to a small aperture, 100 ISO, and a fast shutter speed. Of course, the sharpness of the captured image might be effected by depth of field, aperture, and shutter speed settings. In particular, with most embodiments disclosed herein involving a moving subject vehicle capture an image of a moving target vehicle, the ability to capture an image without introducing blurriness or shading or planar warp is a consideration.

The processor in the LPR system may be programmed to instruct the aforementioned controller to adjust the various setting of the camera device on a periodic basis, regular basis, random basis, and/or other criteria such that the second image is captured with a different camera setting than the first image. In one example, groupings for exposure time, illumination power, and/or other settings may be simultaneously adjusted for different operating scenarios. In another example, the criteria may be based on the relative positions of the target vehicle at a first position in an image and at a second position in a subsequently captured image. In one example, the relative position is the delta/change in position of the license plate from the first image to a subsequent, second image and takes into account the position of the LPR system and the target vehicle with the license plate affixed thereon at each of the image capture events. For example, referring to FIG. 6A, relative speeds of vehicles may be detected taking into consideration that box 601 shows portions of the image with oncoming traffic, and box 603 and box 605 show portions of the image with following traffic. Therefore, the speed of vehicles in box 601 relative to the capturing camera device may be increased, while the relative speed of vehicles in box 603 and box 605 may not be increased because the direction of motion of the camera device is in the same direction as vehicle 604. In some examples, the LPR system may use motion blur analysis of the license plate in one or more of the captured multi-exposure images to calculate the aforementioned relative speed. Then, the LPR system may adjust the image sensor to capture subsequent images with an adjusted exposure setting, accordingly, to reduce motion blur.

In another example, the LPR system may be pre-programmed to instruct the controller to modify one or more capture settings of the camera device based on the relative positions of the target vehicle at a first position in an image and at a second position in a subsequent image, such that the change in the relative positions of the target vehicle in the images shows relative speed. For example, the relative speed of a target vehicle with a license plate is calculated by determining a pixels per second change in the license plate across consecutive images of the license plate captured by the image sensor. As a result, another image may be subsequently captured at a different capture setting than the first image based on the relative positions indicative of relative speed. The relative speed may be measured, in some examples, in units of pixels/second on the image rather than traditional speed units of miles per hour (mph) or kilometers per hour (kph). In other words, the relative speed of the vehicle might not be calculated in km/hr, but the speed of movements of visual features in the pixel space, e.g., delta pixel/second of a fixed point (e.g., top right corner) of the license plate. At least one advantage is that the latter is easier to compute. The algorithm for determining exposure setting is interested in speed delta in pixels/s for blur estimation, and it is more efficient to calculate than accurately measuring km/h. The speed delta in e.g., km/h of a car can be derived from this information, if lens details (e.g., field of view, focal length, blur analysis, distortion model) and license plate size/dimension and location is known.

Figure 6B:
FIG. 6B is a long-exposure image and short-exposure image of a field of view of a street with following traffic and oncoming traffic in accordance with one or more example embodiments.
Figure 6C:
FIG. 6C is a subsequent long-exposure image and short-exposure image of a field of view of a street with following traffic and oncoming traffic in accordance with one or more example embodiments.

Referring to FIG. 6B, with respect to vehicle 606, the system detects a first license plate in a first portion 603 of the first long-exposure time image that was captured with a first long-exposure setting. Then, at a later time, the LPR system captures a second long-exposure time image, as illustrated in FIG. 6C, and detects the same first license plate in a first portion 603 of the second long-exposure time image. The second long-exposure time image may have been captured with the same or different settings as the first long-exposure setting. In some examples, the time between the capture of the images in FIG. 6B and the capture of the images in FIG. 6C may be very small such that the LPR system may perform the steps of the methods disclosed herein in near real-time. For example, the processor and controller of the LPR system captures, detects, analyses, and/or adjust the exposure (or other) settings of the image sensor of the camera device between the capture of images in FIG. 6B and FIG. 6C. In some examples, an application specific integrated circuit (ASIC) processor may be used in the LPR system to improve response time.

Next, the LPR system may select a plurality of images for processing and merging into a consolidated image for reading. As explained in this disclosure and with reference to FIG. 11, in general, there is a greater likelihood of useful OCR of license plates of oncoming traffic (i.e., those with a greater relative speed) in the short-exposure images (as illustrated with step 1210 in FIG. 12); meanwhile, there is a lower likelihood of useful OCR of license plates of oncoming traffic in the long-exposure images; and, a lower likelihood of OCR of license plates of oncoming traffic in consolidated images, such as the image resulting from the merging of the long-exposure image with the short-exposure image because such merging may introduce blur. Meanwhile, step 1208 of FIG. 12 illustrates that when the license plate is on a following vehicle, then a long-exposure image may provide more useful OCR results. Therefore, in one embodiment, the LPR system applies the aforementioned general rules and trained models using artificial intelligence to select a plurality of appropriate images from those captured and processed by the LPR system. And, these selected images are merged into a consolidated image. As a result, the characters of the license plate have a greater probability of being recognized by a computerized OCR platform in the consolidated image than in any one of an initial short-exposure image, a subsequent short-exposure image, an initial long-exposure image, or a subsequent long-exposure image. Notably, the merging of the aforementioned images might not use a temporal noise filter, as in some embodiments disclosed herein. Rather, the merging may involve one, some, or all of the long-exposure images 1103 captured by the camera device of a license plate. Alternatively, the merging may involve one, some, or all of the short-exposure images 1105 captured by the camera device of a license plate. In some instances, the merging might even involve selecting some long-exposure images (or other images captured with adjusted settings) and some short-exposure images for merging into a consolidated image. The determination of whether to select one image over another may include factors such as whether the calculated relative speed of the target license plate is above or below a threshold, whether the image is captured in a low-light situation, and whether a sufficient quantity of images have been captured. Of course, in some embodiments, executing a temporal noise filter to generate a consolidated image may be advantageous and may be incorporated into the methodology executed by the LPR system.

Finally, to perform OCRing of the plurality of the captured multi-exposures images and/or merged/consolidated images, the LPR system may feed the aforementioned images to an AI-trained model to perform optimal OCRing. The AI model may be resident at and executing on a processor, such as GPU 706 in FIG. 4, at the vehicle, or may be located at a remote server 704 that is communicatively coupled with the components in the vehicle. The OCR of the license may include identification of the characters and/or the state classification. Additional information may also be extracted from the license plate image including but not limited to expiration date of the license plate renewal sticker and other information.

The second of four use cases describes one illustrative temporal noise filtering (TNF) use case with following traffic (i.e., traffic that is moving generally on the same roadway in the same direction as the vehicle equipped with the LPR system). The initial step in this illustrative use case is similar to the steps and/or sub-steps described in the first example use case above. As explained above, the LPR system may use one or more object detection libraries to find an object in a captured image that matches the characteristics of a license plate. The library takes a captured image as input and identifies a license plate in the image using object detection. As explained above, a heat map and probability/confidence score may be generated using AI.

For example, the LPR system may comprise a tangible computer memory and a specially-programmed computer processor. The LPR system may, in some embodiments, include a camera device attached to a police vehicle. The memory may store image data (e.g., long-exposure images, short-exposure images, and other data) captured by the camera device, including a first image of the target vehicle at a first time and a second image of the same target vehicle at a second time. The processor may receive the first image from the memory, where the first image shows the target vehicle at a first position. Moreover, the processor may detect a license plate in the first image, where the license plate is in a first portion of the first image.

Next, a processor in the LPR system may use one or more object tracking libraries, several of which are currently commercially available, to detect the same license plate in one or more subsequently captured images. The processor may seek out a second image from the memory, where the second image shows the target vehicle at a second position that is different from the first position. The processor may predict the second position of the target vehicle based on the direction of the vehicle and/or the relative motion of the target vehicle between instances of time. Alternatively, the processor may be programmed to seek characteristics of the vehicle (e.g., vehicle color, shape, make/model) to assist in identification of the same license plate. Moreover, the processor may simply detect the license plate in the second image, where the license plate is in a second portion of the second image.

In one example, the LPR system may demarcate a boundary of (e.g., bounding box around) the license plate to track its position across frames. For example, the library may calculate a feature vector from the license plate and detect the feature vector in the subsequent image(s). In some examples, the tracking may be improved by increasing the frames per second (fps) capture rate. In one example, 60 fps may be beneficial for high speed deltas. The number of frames captured can range from 2-100 (or more). And the fps can be varied as appropriate. The aforementioned settings may be adjusted either statically, dynamically, or manually, as the system is trained and optimal/desired settings are identified for specific situations. In an alternate embodiment, the camera device on the LPR system may generate a video feed comprising the multiple captured frames. The video feed may be regular (i.e., not compressed) before OCRing; or, in other examples, the video feed may be a 4K30 HEVC compressed input or other compressed input. For example, the LPR system may comprise a video encoder configured to encode image data received by the image sensor in a format, such as MPEG-2 (H.262), MPEG-4 (H.264), AOMedia Video 1 (AV1), etc.

In some examples, to conserve memory, the LPR system may, at some point in time, discard all of the captured image outside of the bounding box area, which contains the pertinent license plate information. At least one technological benefit of this step is that less memory is consumed because non-critical image data is discarded from memory. The processor of the LPR system may crop the first image to discard outside of the first boundary of the first image and crop the second image to discard outside of the second boundary of the second image. In some examples, the detecting of the boundary (e.g., bounding box area) and subsequent cropping may be performed by a server computer with a high-speed processor (e.g., a GPU or a chipset that uses artificial intelligence/machine learning for detect operations). The server may be located at the vehicle equipped with the camera device (e.g., in the trunk of the vehicle), or the server may be located remote from the vehicle but communicatively coupled to the LPR system at the vehicle through wireless communication. Although communication with a remote server may introduce latency, thus delay, into the responsiveness of the system, the server may provide higher-speed processing of potentially computationally intensive detection and tracking operations. In an alternate embodiment, the on-premise processor may be configured to perform some or all of the aforementioned computations, but may offload computations to a server when suitable—for example, during times where the on-premise processor is overloaded with high-priority computations.

Figure 7:
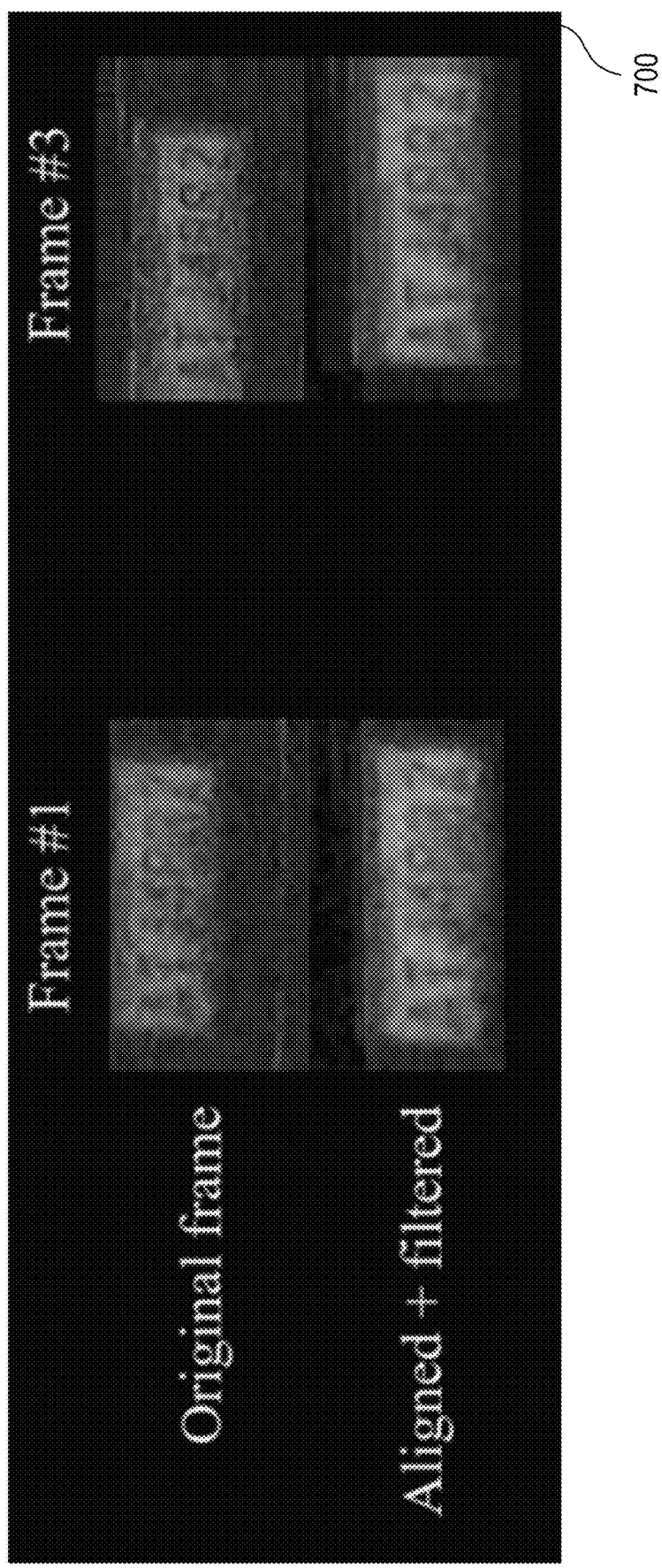
FIG. 7 shows photographs of license plates as originally captured and after aligned and filtered in accordance with one or more example embodiments.

To improve the probability of discerning the contents of the license plate, the processor may align the license plate in the first portion of the first image and the license plate in the second portion in the second image, as depicted in FIG. 7. In the example 700 of FIG. 7, the license plate is likely of a target vehicle that is following traffic because the image does not require much geometric rectification. Rather, FIG. 7 shows that the original captured images (as shown in the top two photos denoted with "original frame") is not aligned. The LPR system described herein aligns the images so that the position of the license plate in both images nearly matches the pixels of each image. In one example, the alignment may be performed by identifying a fixed pixel (e.g., upper-left corner of the overall license plate) of the image and aligning the image based on that fixed pixel. With the images aligned (as shown in the bottom two photos denoted with "Aligned+filtered"), a filtering process, such as TNF/TNR, may operate on the consecutive images to enhance the legibility of the alphanumeric characters (or other information) on the license plate. The filtering process may be performed on simply two images, or may be performed on a plurality of aligned images. For example, FIG. 7 shows the results 700 (i.e., the image in the right-bottom corner) of aligning and filtering of three images. With an increased number of images and/or processing, the legibility of the license plate information improves.

In addition to aligning the images of the license plates across frames, the processor of the LPR system may also transform the image to further enhance the legibility of the license plate information. For example, a first portion and second portion of the image that encompasses the license plate may be further processed to optimize the legibility of the license plate information. The transforming may include geometrically rectifying one or more frames to accommodate for relative positions of the target vehicle at a first position and a different second position when subsequent images are captured by the camera device. The LPR system may use one or more commercially-available libraries that assist in transforming images, including scaling the image, warping the image, rotating the image, and/or other functions performed on the image. Once the images are geometrically rectified and aligned, the images are in optimal condition for application of an image processing filter to enhance legibility of the alphanumeric information on a license plate.

Figure 8:
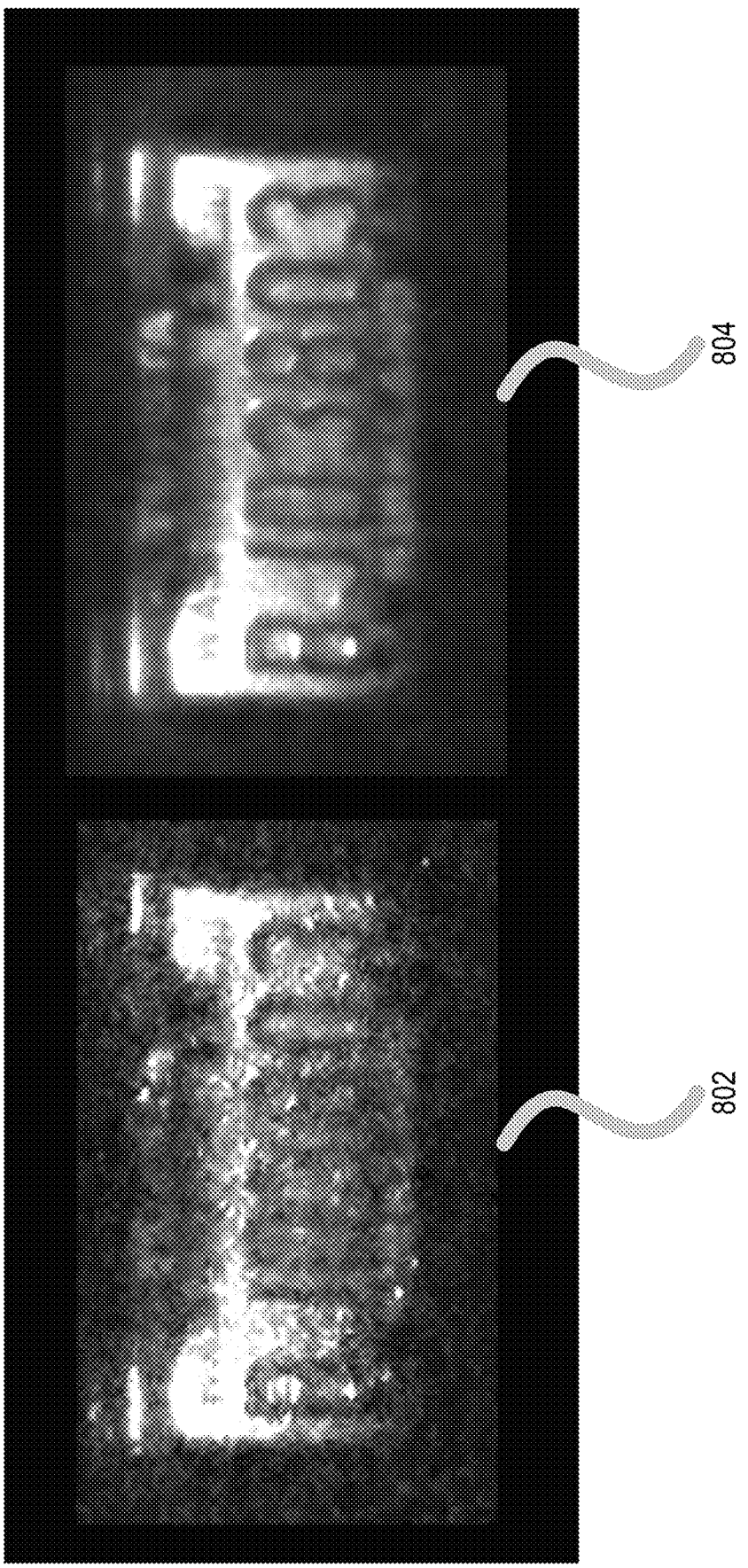
FIG. 8 is a comparison of a photograph of an unfiltered image and a filtered image in accordance with one or more example embodiments.
Figure 9A:
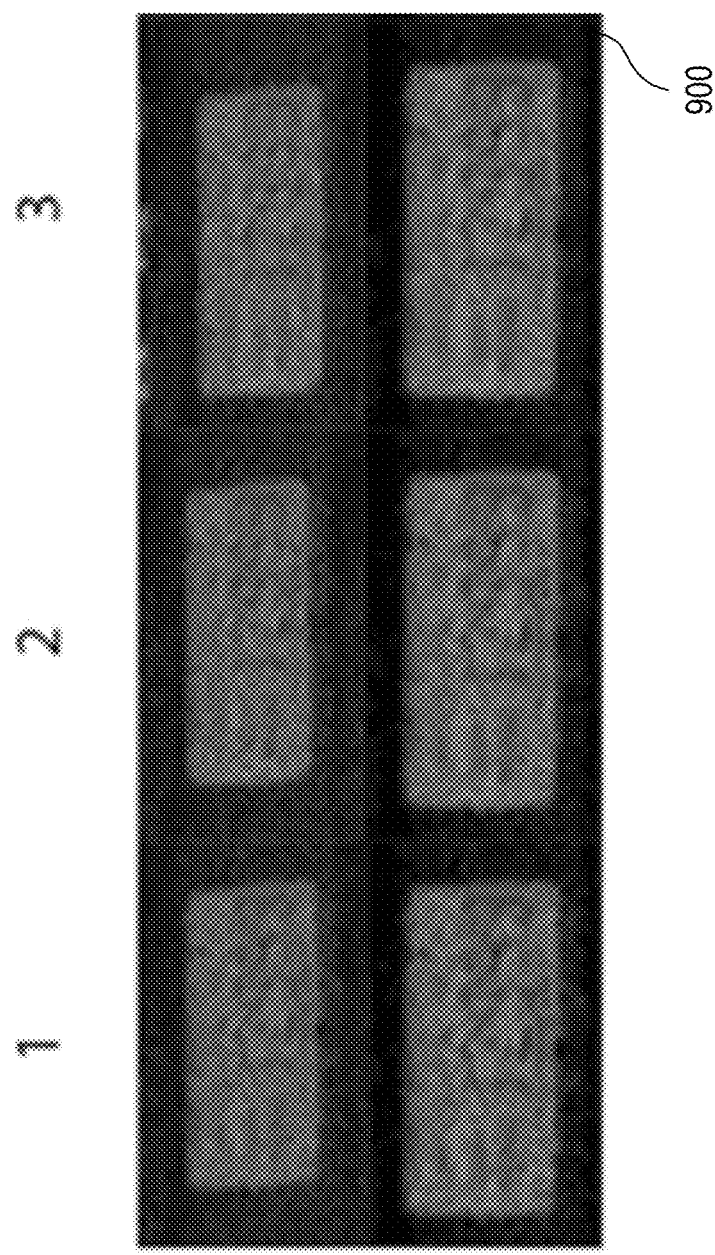
FIG. 9A, FIG. 9B, and FIG. 9C show photographs of license plates as originally captured and after aligned and filtered across multiple frames in accordance with one or more example embodiments.
Figure 9B:
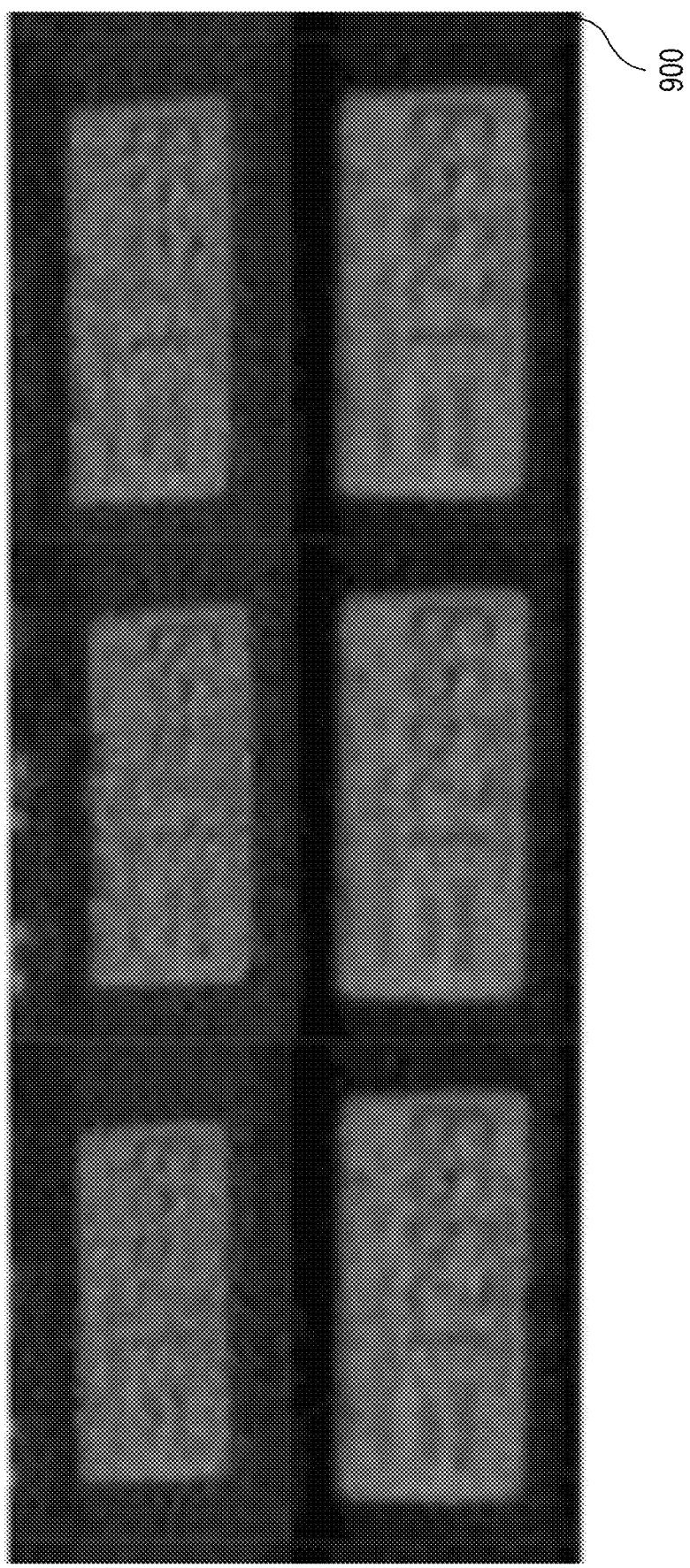
Figure 9C:
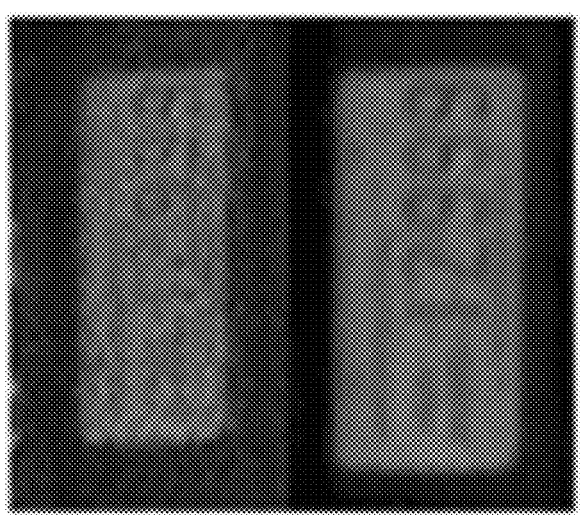
Figure 9C:
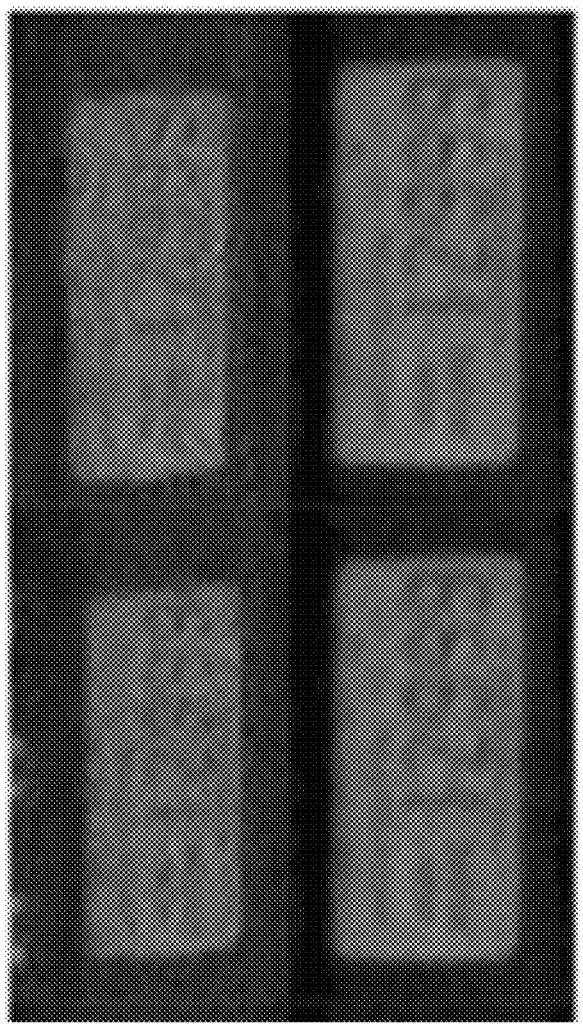

In one example, once aligned and transformed, the processor of the LPR system may execute a temporal noise filter (TNF) on the first portion of the first image and the second portion of the second image to generate a consolidated image. Referring to FIG. 9A, FIG. 9B, and FIG. 9C, the results 900 of the filtering is that the consolidated image (e.g., compare FIG. 9C to FIG. 9A) has a higher probability that the alphanumeric characters and images of the license plate in the consolidate image are recognized by a computerized optical character recognition (OCR) platform than the license plate in the first image. With the filtering, as FIG. 9C illustrates, an availability of a larger quantity of consecutive images taken at different exposures (and other settings) aids in providing a higher quality consolidated image. In one example, a consolidated image is considered to be higher quality when more of the characters on the license plate are correctly identified by an OCR platform. In another example, an LPR system is considered to generate a higher quality consolidated image when fewer images are used to generate a filtered end result that correctly results in an OCR platform identifying the same number of characters on a license plate. At least one advantage of filtering is that it may result in characters in the image having a sharper contrast and image. As illustrated in FIG. 8, an unfiltered image 802 produces characters that are less sharp and more difficult to recognize than a filtered image 804.

Although this use case mentions aligning, transforming, and filtering of image frames to arrive at an optimized output image, this disclosure contemplates and covers embodiments where one or more of the aligning and transforming steps are omitted. Although the resulting image may not be of as high quality as compared to when all processing steps are performed, alternative implementations may find such processing beneficial—e.g., if a processor is overloaded or inaccessible and unable to perform all the aforementioned steps, or if a faster response time is critical. In addition, although the aforementioned example references a processor at the vehicle executing the align, transform, and TNF filtering steps, in some examples, the processing unit may be co-located between a first processor at the vehicle and a second processor in a server machine (e.g., in a cloud environment readily accessible from the vehicle). In such embodiments, the processor at the vehicle may capture images and perform some/no/little pre-processing of the captured images, then send the image to a processor in the server to perform additional steps of aligning, transforming, and/or application of a filter. The processor in the server machine may also be responsible for calculating a relative speed of the target vehicle based on a change in position of the license plate on the subsequently collected images. The disclosure contemplates that in some scenarios locating the processor at the vehicle with the camera device performing the image capture may reduce latency and improve response time.

In a similar vein, the disclosure contemplates other examples involving combinations or sub-combinations of the aforementioned steps. In some examples, the temporal noise filtering (TNF) may be applied to a subset of all of the plurality of frames. In other examples, different sub-combinations of the plurality of frames may be used until a best final image is identified. Specifically, depending on the desired response time/latency of the LPR system, the processor may select specific images for immediate processing on-site, while transmitting all or some of the image data to a server with a high-speed processor for additional processing. The results of the two processes may be compared and the on-site results may be supplemented/corrected if a more precise OCR is performed by the server.

In another example, other filtering techniques besides TNF may be used. At least one advantage of TNF over traditional multi-frame noise filters is that the shape and size of the moving license plate changes dramatically as it passes the camera device. The LPR system is configured with the information of the shape of the license plate (e.g., rectangular) and uses this fact to further optimize the image processing. In some examples, the LPR system uses the warped license plate stack to reduce the noise and improving its visual quality, e.g., averaging or super-resolution. TNF is one of many potential methods that may be used to improve image quality of captured license plates. TNF is particularly effective and provides better results when the same license plate is tracked and captured for multiple frames at different times, then aligned between frames. This disclosure contemplates that other filtering techniques or hybrid combination of filters may be used on the plurality of frame data.

Once the final output of the filtering stage is complete, the consolidated image may be submitted to an OCR platform for identification of the characters and/or the state classification of the license plate. As illustrated in FIG. 9C, the license plate information appears to be "12999". The LPR system may transmit this license plate information and/or other information to other systems for processing and evaluation, as described herein, for law enforcement purposes and/or other purposes.

The third of four use cases describes one illustrative temporal noise filtering (TNF) use case with incoming traffic (i.e., traffic that is not moving on the same roadway in the same direction as the vehicle equipped with the LPR system). Incoming traffic may be traffic that is on the same roadway as the vehicle equipped with the LPR system, but also includes traffic that is on another roadway (e.g., an intersecting street, an adjacent high-way on-ramp, and others). The incoming traffic had a relative speed delta that attenuates the captured image more than the preceding illustrative use case involving following traffic.

In this illustrative use case, the initial steps are similar to the preceding use case in that the LPR system captures images using one or more camera devices, then license plate (LP) detection and tracking occurs. However, because the images collected from incoming traffic tend to be more attenuated, the steps of optimizing the image by geometric rectification are more extenuated. For example, when transforming/optimizing the image of the license plate using geometric rectification, the scaling, warping, rotating, and/or other functions performed on the image may be extenuated because both the relative speed delta may be higher and the angular speed of the incoming vehicle will increase as the vehicle gets closer.

FIG. 10 illustrates that a car's license plate 1002 is detected in the image, then edge detection is performed on the image 1004 of the license plate. Although the car in the image 1002 is following traffic, for various reasons, the image of the license plate is not the traditional rectangular boundary shape. Rather, the image 1004 is a parallelogram boundary shape. The LPR system detects that the image requires transforming and executes one or more libraries on the image to adjust the image into the transformed image 1006. The transformed image, if sufficiently sharp in some examples, might not require aligning or TNF processing. Rather, in that example, the transformed image may be sent to an OCR platform for immediate processing and determination of the license plate information. In other examples, multiple images of the aligned, transformed image may be applied to a TNF to generate a higher quality composite image. In addition to determining the license plate numbers, the LPR system may also analyze characteristics of the license plate image 1008 to identify the state/country of the plate. In this case, the formatting of the alphanumeric license plate numbers, colors, and positioning, along with preliminary image recognition of the "Illinois" in the upper portion of the license plate image, permits the LPR system to determine with a particular confidence score that this is an Illinois license plate. In addition to image processing, the LPR system may also consider GPS coordinates, as provided by a location determination unit (e.g., GPS receiver) in the camera vehicle, to narrow the list of likely state plates. For example, any given vehicle located near the border of Illinois and Indiana has a higher likelihood of being an Illinois or Indiana plates than Georgia plates. The LPR system may access rules and ML-trained models regarding state plates to increase the accuracy of its determination.

In the preceding example, a TNF is used to sharpen the characters of the license plate in the one or more images. Temporal noise filtering is different from traditional multi-frame noise filters because, among other things, the shape and size of the boundary of the moving license plate changes dramatically as it passes the camera car. The LPR system is able to detect, track, and then transform the license plate image by using the fact that the shape of the license plate is known and predefined. In some examples, the LPR system may use the warped license plate stack to reduce the noise and improving its visual quality. e.g., averaging or super-resolution. In some implementations, the LPR system may supplement or supplant the processor with an application-specific integrated circuit (ASIC) processor. The ASIC processor is designed to perform the specific operations and functionality described herein, thus providing a potentially faster response time and computational savings.

In some examples, the processing unit (e.g., processor) may be co-located between a first processor at the vehicle and a second processor in a server machine (e.g., in a cloud environment readily accessible from the vehicle) to distribute execution of the align, transform, and TNF filtering steps. The processor at the vehicle may capture images and perform some/no/little pre-processing of the captured images, then send the image to a processor in the server to perform additional steps of aligning, transforming, and/or application of a filter. In a similar vein, the disclosure contemplates other examples involving combinations or sub-combinations of the aforementioned steps. In some examples, the temporal noise filtering (TNF) may be applied to a subset of all of the plurality of frames. In other examples, different sub-combinations of the plurality of frames may be used until a best final image is identified. Specifically, depending on the desired response time/latency of the LPR system, the processor may select specific images for immediate processing on-site, while transmitting all or some of the image data (e.g., long-exposure images, short-exposure images, and other data) to a server with a high-speed processor for additional processing. The results of the two processes may be compared and the on-site results may be supplemented/corrected if a more precise OCR is performed by the server.

This use case contemplates and covers embodiments where one or more of the aligning and transforming steps are omitted. Although the resulting image is not of as high quality as compared to when all processing steps are performed, alternative implementations may find such processing beneficial—e.g., if a processor is overloaded or inaccessible and unable to perform all the aforementioned steps, or if a faster response time is critical.

Figure 13:
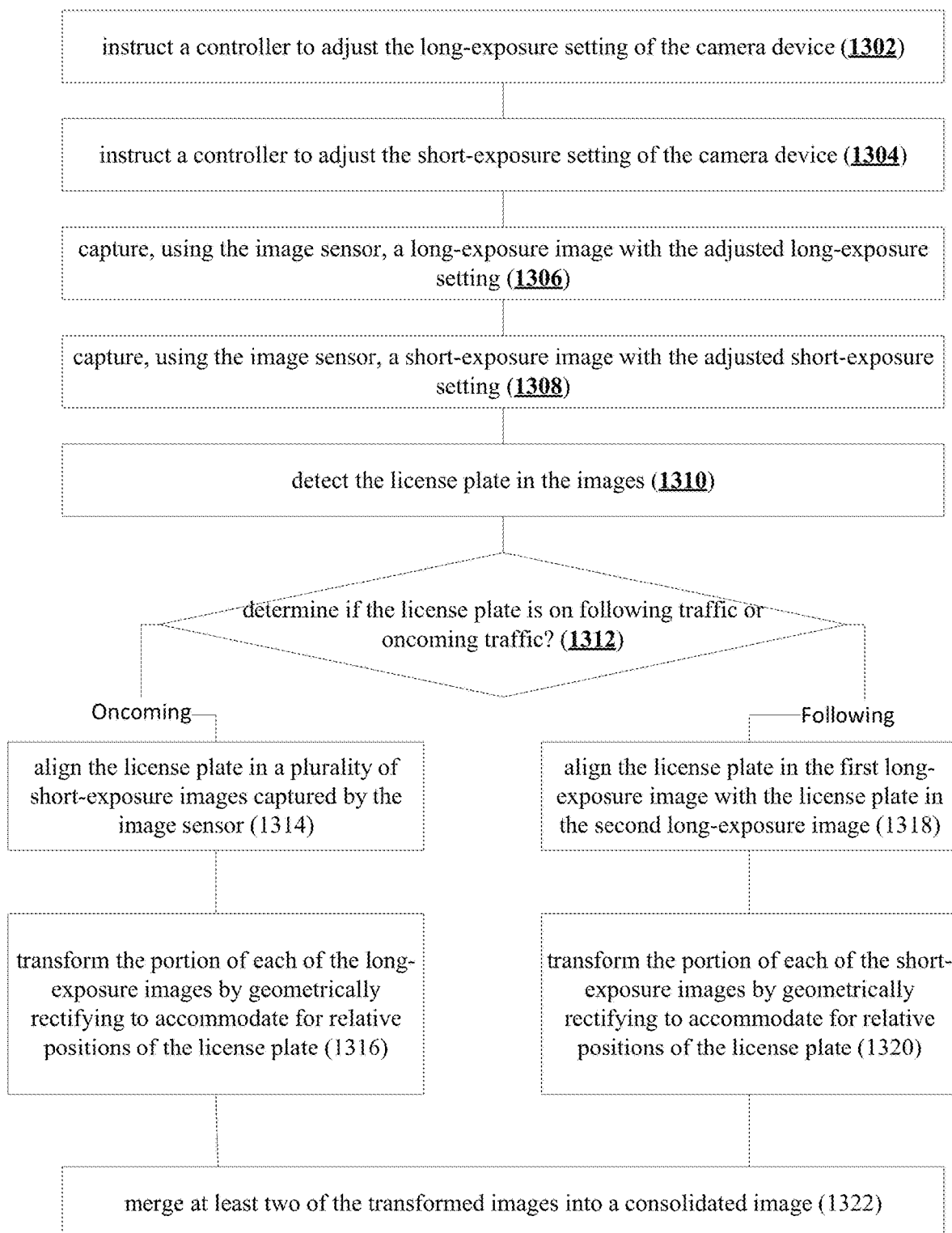
FIG. 13 is a flowchart in accordance with one or more examples of merging of multiple frames from an image stream to enhance an LPR system.

Referring to FIG. 13, the fourth of several use cases describes one illustrative embodiment with aspects of multi-exposure capturing features coupled with temporal noise filtering (TNF). The initial step in this illustrative use case is similar to the steps and/or sub-steps described in the three example use cases above. As explained above, the LPR system may use an image sensor to take multiple images of the same license plate, but under varying conditions. The camera device keeps separate two streams of image frames being captured by the image sensor. The image sensor may be an HDR sensor in some examples. A high dynamic range (HDR) image is captured by taking multiple photos of the same license plate, but each at different shutter speeds, thus resulting in images with varying brightness/shadows/highlights: bright, medium, and dark. The image brightness is based on the amount of light that arrives at the image sensor. The HDR sensor includes post-processing circuitry/firmware that combines the series of images by adjusting the contrast ratios to bring details to the shadows and highlights; the resulting consolidated image is usually not possible with a single aperture and shutter speed. The consolidated image is made by taking multiple images of the same scene, but each at different shutter speeds, resulting in a bright, medium, and dark images based on the amount of light that gets to the lens.

The term HDR image sensor, as used in this disclosure includes but is not limited to a dynamic range sensor, a wide dynamic range (WDR) sensor, and other sensor types. In some examples, a wide dynamic range (WDR) sensor provides dual-exposure (dark and light) image/video capture that when consolidated into a composite image, is able to retain details in both light and dark portions of the frame. This keeps bright areas from looking over-exposed and darker areas from losing detail in high-contrast situations. Moreover, modern image sensors can sometimes capture a high dynamic range from a single exposure. The wide dynamic range of the captured image is non-linearly compressed into a smaller dynamic range electronic representation. However, with proper processing, the information from a single exposure can be used to create an HDR image. Other types of image sensors as also contemplated for use in this disclosure, including but not limited to charge-coupled device (CCD) sensors, complementary metal-oxide (CMOS) sensors, and organic photoconductive film (OPF) sensors, i.e., a type of imaging sensor that uses two separate layers—one that's the light-sensitive "film" and another layer of circuits—to transform that light layer into electrical currents to create a digital image. OPF sensors are sometimes better in low light because of that multilayer design; the layer structure sometimes allows division of the pixel's electrodes into large and small areas such that the image sensor can then change the voltage applied to the first layer, essentially adjusting how sensitive the sensor is to light on a per-pixel basis. The effect is a wider dynamic range.

Figure 11:
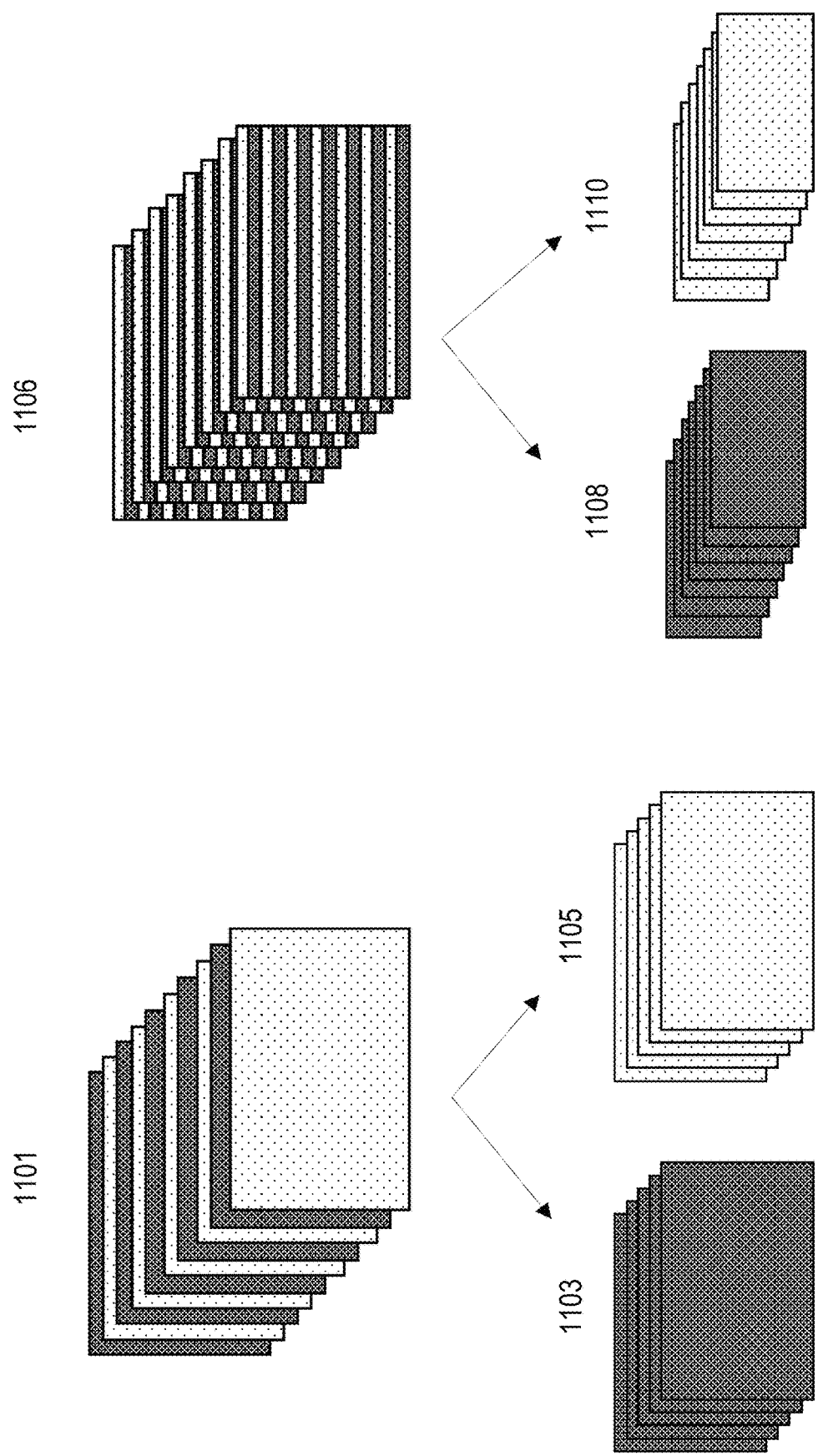
FIG. 11 depicts serial and parallel configurations for image capture with an image sensor in accordance with one or more example embodiments.

Referring to FIG. 11, an image sensor may capture images at a rate of a number of frames per second (e.g., 60 fps). In one example, an image sensor may be set to alternate exposure every other frame to capture a plurality of images 1101. The captured images 1101 may be split into separate streams of long-exposure images 1103 and short-exposure images 1105. In effect, this results in a halved frame per second rate (e.g., 30 fps) for each of the image streams. The image sensor in the aforementioned example is nearly simultaneously outputting images of the field of view in a serial manner, e.g., frame by frame. The setting of the camera device is alternated every other frame from the long-exposure setting to the short-exposure setting, even when the image sensor is a single image sensor.

In contrast, referring to FIG. 11, The image sensor may nearly simultaneously output images 1106 of the field of view in a parallel manner, e.g., line by line. The image sensor may be set to capture with a long-exposure setting for a first set of lines in a frame while simultaneously to the short-exposure setting for a second set of lines in the same frame. As a result, multiple exposures can be taken in parallel (e.g., line by line using line pairs on Bayer mosaic) within a single frame, and then the exposures can be separated; the separated streams may result in lower resolution in each of the separate streams of long-exposure images 1108 and short-exposure images 1110. Although FIG. 11 shows the plurality of frames 1106 with an interlaced line-by-line configuration, the first set of lines with a first exposure (or other) setting and a second set of lines with a second exposure (or other) setting need not be in an interlaced configuration. For example, the image sensor may be set to capture with a long-exposure setting for a first set of pixels on a sensor, and set to simultaneously capture a short-exposure setting for a second set of pixels on a sensor, wherein the first set of pixels is different than the second set of pixels (e.g., alternating in a checkerboard pattern). Moreover, the separate streams 1108 and 1110 (and for that matter, streams 1103 and 1105) need not be just different exposure settings. In some examples, other settings of the image sensor, as described throughout this disclosure, may be adjusted to provide a variation in image capture.

In this use case, the LPR system may calculate the relative speed of the vehicle with a license plate in the captured images. Some of the challenges in using a camera to capture license plates of vehicles is fast relative motion, potential low light conditions, and a combination of both. To enhance license plate recognition, the camera device may increase the duration of time the shutter is open (i.e., slower shutter speed), but this can cause more blur when objects (e.g., vehicles) are moving fast relative to each other. In order to reduce blur and optimize license plate capture, the relative speed of the vehicles may be calculated using video analytics of a detected license plate—e.g., optimize shutter speed in subsequent moments to capture images with the most light possible given the speed of relative movement. In one example, the relative speed may be calculated using motion blur analysis of a frame. In another example, the relative speed may be calculated using one or more of the methods disclosed herein in combination with one or more hardware components disclosed herein. Using the calculated relative speed, the LPR system may optimize the exposure (or other) settings on one or both the long-exposure setting and short-exposure setting of the image sensor.

For example, referring to FIG. 13, the exposure settings of the first stream may be optimized for detecting plates on vehicles with a low relative speed (in step 1302), while the second stream may be optimized for detecting plates on vehicles with a high relative speed (in step 1304). In general, when using a single camera to capture multiple exposure images, there is a greater likelihood of OCR of license plates of oncoming traffic (i.e., those with a greater relative speed) in the short-exposure images. Meanwhile, there is a lower likelihood of OCR of license plates of oncoming traffic in the long-exposure images. And, a lower likelihood of OCR of license plates of oncoming traffic in consolidated images, such as the image resulting from the merging of the long-exposure image with the short-exposure image because such merging may introduce blur. Rather, the LPR system disclosed herein, in some examples, increases likelihood of OCR by iteratively cycling through exposure times (effectively capturing more exposures). In one example, the LPR system may use a controller (or other component) to adjust exposure settings by a predetermined amount (e.g. 1.5×). For example, for exposures captured in series, the $1^{st}$ frame may be 1 ms (first short-exposure frame), 2nd frame may be 10 ms (first long-exposure frame), 3rd frame may be 1.5 ms (second short exposure frame), and the $4^{th}$ frame may be 15 ms (second long-exposure frame). The aforementioned values are merely one example, and the values in various embodiments may be different and varied as appropriate. In some examples, the LPR system may cycle through the exposure settings, or may use a random shuffle of the values to capture varying exposure of images. In another example involving capturing in parallel, the $1^{st}$ frame may be at 1 ms for a first group of lines and 10 ms for a second group of lines, and the $2^{nd}$ frame may be at 1.5 ms and 15 ms. The aforementioned values are merely one example, and the values in various embodiments may be different and varied as appropriate. Other combinations and variations of the predetermined values, random shuffling, and other methods, as disclosed herein, are contemplated in the aforementioned examples.

In some examples, the LPR system may optimize/adjust image sensor settings (e.g., exposure) based on detected speed of the tracked license plate. Then the calculated relative speed may be used to tune the camera's exposure settings to best capture the plate for optical character recognition. Referring to FIG. 13, in step 1306 and 1308, the LPR system captures additional images with the adjusted long-exposure and short-exposure settings. In some examples, the exposure settings may have been set based on lighting conditions. In some embodiments, a hybrid model may be used that takes a weighted combination (e.g., 50/50 equal weight, or some other weight) of relative speed and lighting conditions to determine and set optimal camera device settings. For example, the combination may be a subset of claimed features or part of the overall system claimed. In some examples, the properties of the capturing camera device may be adjusted automatically or dynamically. Moreover, in some examples, the exposure times may be selected by auto-exposure so that the camera device best balances the motion blur and noise for the image streams. Finally, in some examples, the long-exposure stream may be optimized for following traffic and the short-exposure time for the oncoming traffic. For example, in FIG. 6B, with respect to vehicle 607, the system detects a license plate in a first portion 601 of the first short-exposure time image that was captured with a first short-exposure setting. Then, at a later time, the LPR system captures a second short-exposure time image, as illustrated in FIG. 6C, and detects the same license plate in a first portion 601 of the second short-exposure time image. The second short-exposure time image may be captured with the same or different settings as the first short-exposure setting. In one example, the second short-exposure setting may have a fast shutter speed and increased ISO (to maintain total exposure of image) compared to the first short-exposure setting.

Referring to FIG. 13, next, the long-exposure and short-exposure image streams may be modified as described in the preceding examples in preparation for temporal noise filtering (TNF). In step 1310, the LPR system detects the license plates in the images. And, in step 1312, the LPR system determines if the license plate is on following traffic or oncoming traffic. If it is oncoming traffic, then the stream of short-exposure images is aligned and transformed in steps 1314 and 1316, as described below. Meanwhile, if it is following traffic, then the stream of long-exposure images is aligned and transformed in steps 1318 and 1320. In one example, only the long-exposure images may be aligned and geometrically rectified before executing a TNF on the multiple images to create a single, composite image in step 1322. In another example, the same steps are performed on only the short-exposure images. In yet another example, the long-exposure images and short-exposure images may be mixed and the license plate may be tracked across the two, separate image streams to generate the best TNF, composite image. In another example, the system may calculate the angular velocity of the incoming traffic and select between the long-exposure and short-exposure stream accordingly. In other words, one or both of the images from each timestamp may be selected for TNF before consolidation into a single image. The LPR system applies temporal noise reduction/filtering (TNF) to the plurality of images, such as the aforementioned ones referenced in FIG. 6B and FIG. 6C, by aligning, transforming, and/or merging into a consolidated image. The consolidated image may be OCRed to identify the license plate characters and other identifying information.

In some examples, the LPR system may further comprise a location tracking device coupled to the camera device. The processor of the LPR system may be programmed to stamp an image with a location of the camera device at the time when the image is captured by the camera device. In addition, the LPR system may also comprise a clock mechanism. The processor of the LPR system may be programmed to timestamp an image upon capture by the camera device. At least one benefit of the aforementioned metadata associated with the captured and processed image is that evidentiary requirements in a legal proceeding or other investigation may be satisfied. Moreover, for report generation purposes, the metadata, e.g., location, date, time, and other information, may be collected into a central data store, indexed, tagged, and displayed in a visually useful format. In addition, the tracking of license plates can also produce other useful information, e.g., how fast the cars are moving. And, numerous actions can be triggered based on this useful information. In one example, the LPR system measures the relative speed of the vehicles using video analytics of the recognized license plate. Then, the system optimizes shutter speed in subsequent moments to capture images with the most light possible given the speed of relative movement.

As explained above, in one example the camera device attached to the police vehicle may include a plurality of cameras arranged at different locations of the police vehicle and configured to operate in a coordinated manner to capture images of vehicle license plates or other items. The captured images may be output to a shared memory. A computer processor of the LPR system may receive from the memory one or more of these images captured from multiple cameras, and then perform one or more of the methods disclosed herein. In one example, a single law enforcement vehicle may be equipped with one camera device facing towards traffic in front of the vehicle and a second camera device facing towards traffic to the rear of the vehicle. In another example, an additional camera device may be positioned to the right or left side of a law enforcement vehicle to assist in capturing license plate images of vehicles traveling at an angle (e.g., perpendicular at a street intersection) to the law enforcement vehicle. The image sensors from these multiple camera devices may capture images and process the collective images to identify the characters and other characteristic of license plates of vehicles in their proximity. The processor of the LPR system may use one or more images, which are stored in the shared memory, from each of the camera devices to increase the probability of recognizing by a computerized optical character recognition platform, the characters of the license plates. In some embodiments, multiple camera devices may be affixed to a single vehicle in various orientations and/or positions. In addition, in some examples, at least one of the aforementioned plurality of cameras may include an unmanned aerial vehicle (UAV) equipped with video capture capabilities. The UAV may be mounted to the vehicle and may be automatically launched as appropriate by the LPR system upon occurrence of particular trigger events.

The system is not limited to traditional vehicles. Rather, unmanned aerial vehicles (UAVs) or drones are also considered vehicles for purposes of this disclosure. FIG. 2B illustrates a UAV equipped with the device 201. The installation of the device 201 on a UAV may rely upon components that were optional in a car installation. For example, GPS unit 212 (or comparable location tracking technology) may be critical to a device 201 installed on a UAV because of the UAVs ability to travel outside the confines of traditional lanes on a highway. Moreover, the UAV may optimize the illumination pattern from the device 201 to focus in a downward direction towards the road. The micro-controller 204 and AI component 216 in the device 201 may be used to train the system to optimize the capturing of license plate numbers of vehicles. Finally, in UAV installations, the operations of the camera apparatus 201 may be modified to account for any high-frequency vibrations that might occur from capturing images or video from a UAV. For example, a global shutter feature may be implemented in the camera apparatus 201 to reduce rolling shutter effect that might be caused by vibrations.

Figure 2E:
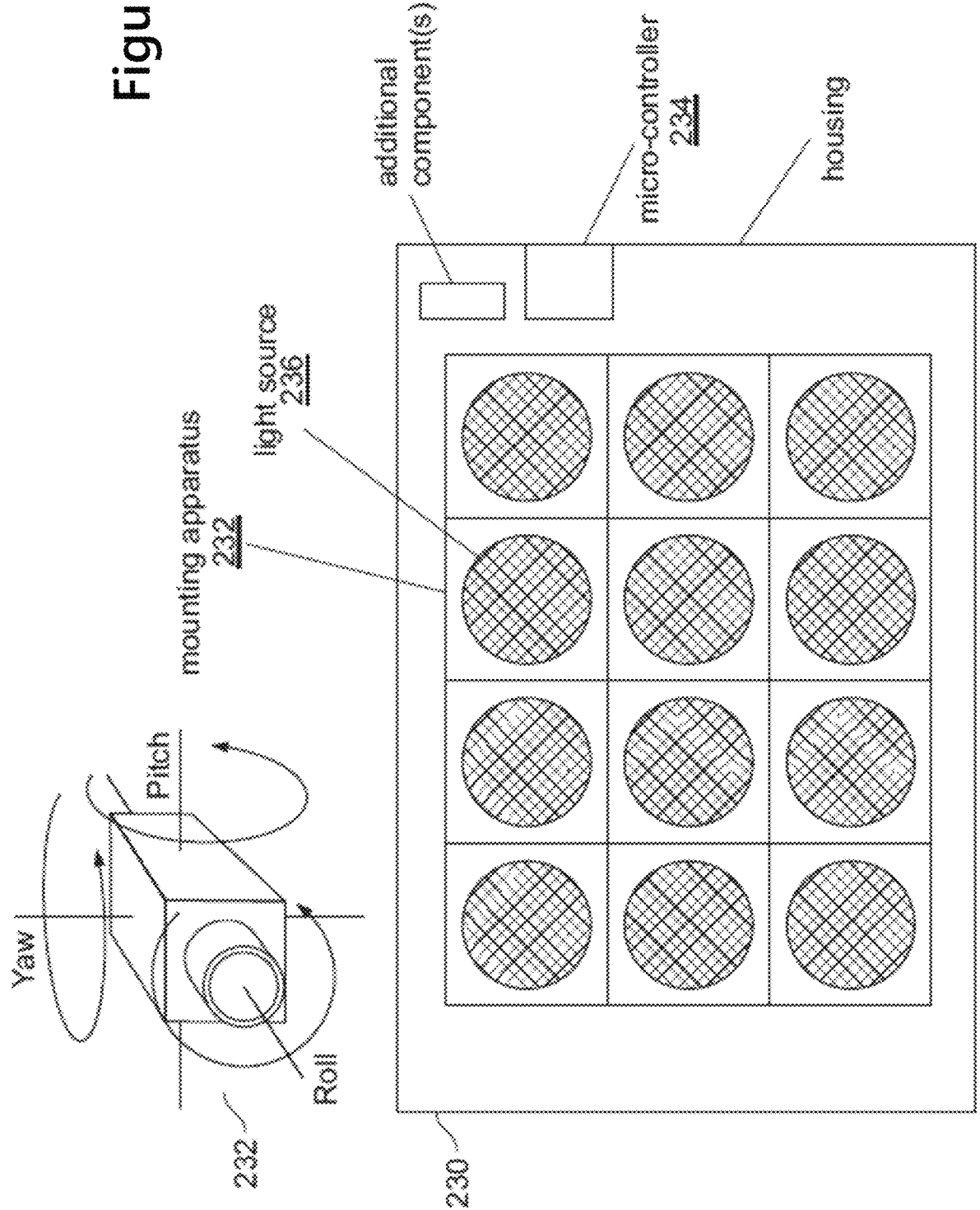
FIG. 2E is an illustrative light emitting apparatus in accordance with one or more example embodiments.
Figure 2F:
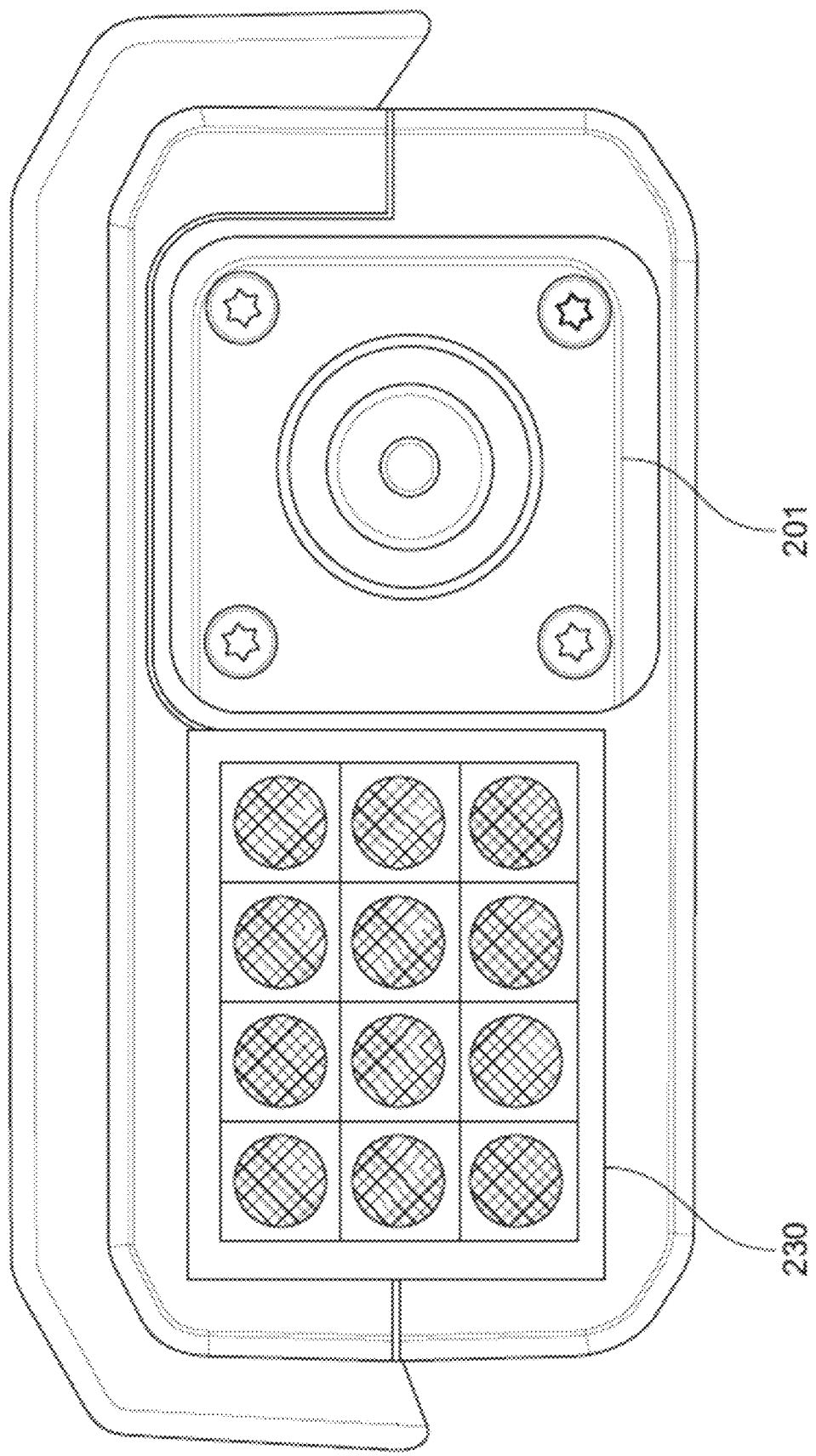
FIG. 2F is an illustrative light emitting apparatus in accordance with one or more example embodiments.

Referring to FIG. 2C and FIG. 2F, the illustrations are of embodiments of the system for commercial sale and use. Assembly 201 is a configuration of a camera apparatus 201 with a plurality of light emitting apparatuses 230. The assembly 201 may be mounted to the front of a police car to capture images for license plate recognition. The assembly 201 may draw power from the subject vehicle. Although FIG. 2C depicts the components of assembly 201 as a single object, in some examples, the parts of assembly 201 may be separated and installed separately or in an organized, different manner.

FIG. 2F illustrates one installation of the system where just one light emitting apparatus 230 is combined with the camera apparatus 201. The device may be mounted inside a vehicle, or outside a vehicle. For example, as illustrated in FIG. 3, the device 201 may be mounted to the top of a police car 108. Moreover, the device may be capable of over-the-air (OTA) software updates to its software and data. The device 201 may also seamlessly connect with a local, wireless network comprising other components in the vehicle 108 and accessories 322 carried by or worn on the operator of the vehicle 108. Moreover, connecting with the local network provides the device 201 with event notifications, such as when the operator opens the car door, activates a police car's light/siren bar, and other events, so the device 201 can react accordingly. Once connected with the local network of devices, the device 201, 412 may connect as illustrated in FIG. 4 with a computing device 414 to assist it with calculations, storage, and other computations.

Although the grid pattern 230 in FIG. 2E is illustrated as a rectangular arrangement, the configuration of light sources (e.g., LEDs) in a grid is not limited to such arrangements. The grid may be a circular grid, elliptical grid, or any other shape conducive to generation of an illumination pattern. The mounting apparatus may operate in response to an electrical signal received from a micro-controller or other external source. As a result, the light emitting apparatus 230 may generate a customized illumination cone as desired. Although LEDs are used as one example of a light source, other types of lighting elements, such as halogen bulbs and the like are contemplated for use with the system. LEDs, however, may be preferred due to their fast response time, ability to be switched on and off at a high frequency without substantially impacting bulb life, and lower power consumption. In some examples, the LEDs and other light sources may emit light in the infrared frequency range to aid in image capture in low-light or night time situations. Another benefit of infrared light is that it select frequencies of infrared light are non-visible to the eye, thus has a less negative impact on operators of target vehicles in oncoming traffic. Furthermore, infrared light may be desirable in situations where covertness is desired. For example, the LEDS and other light sources may emit infrared light comprising a peak wavelength of between 800 nanometers and 850 nanometers, between 850 nanometers and 900 nanometers, between 900 nanometers and 950 nanometers, between 950 nanometers and 1000 nanometers, between 1000 nanometers and 1100 nanometers, or between 800 nanometers and 1100 nanometers according to various embodiments described herein.

Referring to FIG. 2E, a standalone light emitting apparatus 230 is illustrated. The light emitting apparatus 230 may include a micro-controller 204, similar to the one in the camera apparatus 201, for controlling configuration settings of the light emitting apparatus 230. The light emitting apparatus 230 provides functionality to the system because it generates and emits the illumination pattern that improves image capture quality. The light emitting apparatus 230 may be mounted to a vehicle such as a police car, motorcycle, or other vehicle. The apparatus 230 may be mounted inside the vehicle, or may be securely mounted to the outside of the vehicle. The light emitting apparatus 230 comprises a body, at least one light source, a mounting apparatus 232 inside the body that couples the light source to the body, and a micro-controller. As illustrated in FIG. 2E, the mounting apparatus 232 may be coupled with the light source such that it permits the micro-controller to automatically, and without human intervention, tilt the light source along at least one of its roll, pitch, and yaw axes. In some examples, the mounting apparatus might allow adjustment in all three axes in response to a tilt command from the micro-controller. The end result of the tilting and re-orienting of the light sources is an asymmetrical illumination cone pattern being emitted towards a lane near the one on which the subject vehicle is traveling. The target vehicle's lane need not necessarily be adjacent to the subject vehicle's lane. Rather, the system may be trained to adapt to different road configurations in different geographic areas.

In addition to tilt commands, the micro-controller may also generate and send illumination commands to the light source. The light source may be further configured to emit light at one of a low, medium, and high illumination in response to an illumination command. Illumination commands are not limited by the enumerated list provided here. Rather, illumination commands may include any denotation of varying illumination levels.

Whether a light emitting apparatus 230 will emit low, medium, or high illumination is based on the values generated by the distance measurement component and the speed delta measurement component. In one example, the distance measurement component and the speed measurement component may share a laser beam generator positioned in the body. The laser beam generator is configured to emit a laser beam to measure the approximate distance to the target vehicle and the relative speed of the target vehicle. Such measurements are then sent to the micro-controller for rapid decision making. In an alternate embodiment, an external device may provide tilt commands and illumination commands through an external port interface in the light emitting apparatus 230.

Figure 14:
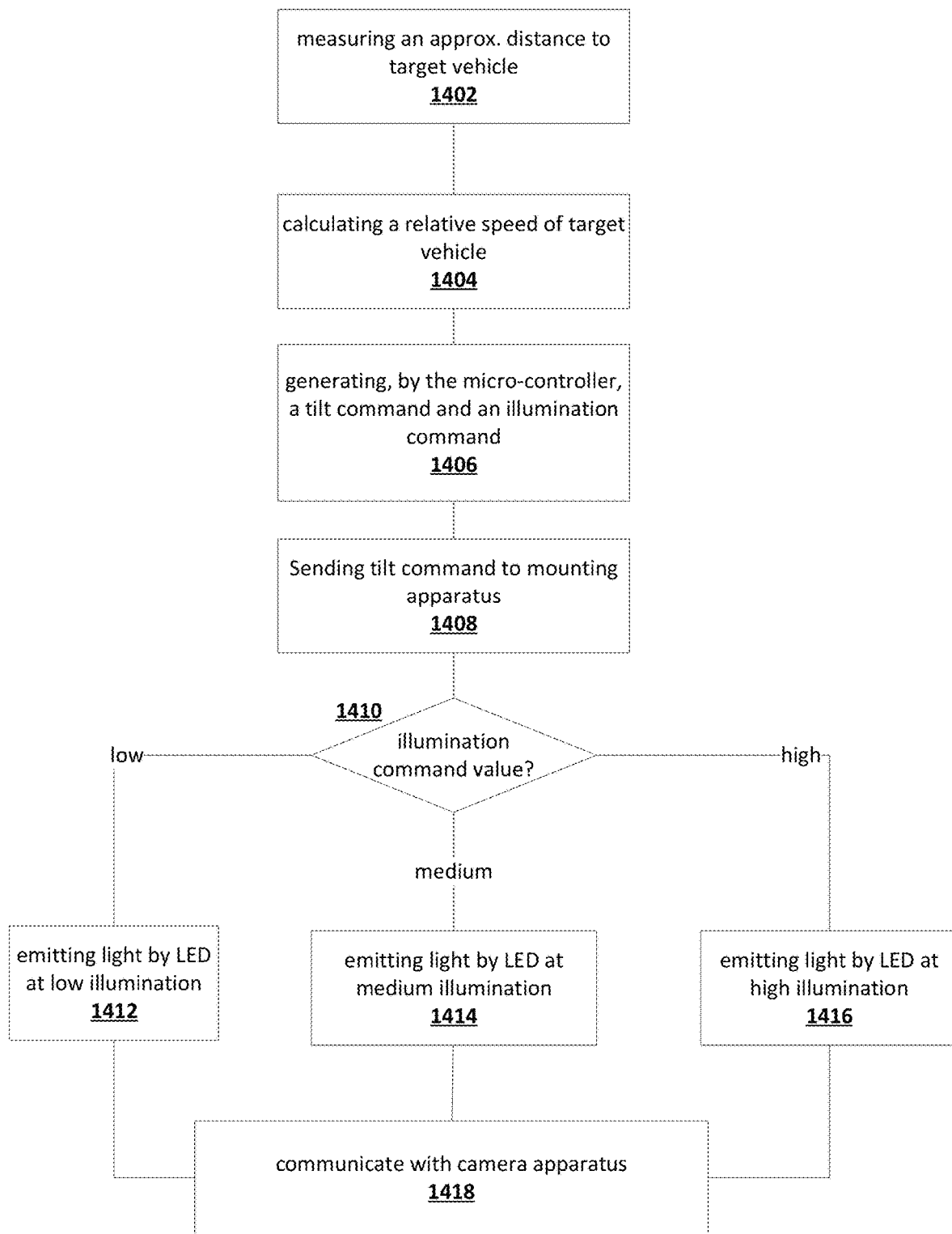
FIG. 14 is a flowchart in accordance with one or more example embodiments.

Regarding FIG. 14, the flowchart illustrates an example of an operation of a light emitting apparatus 230 in accordance with various aspects of the disclosure. In steps 1402 and 1404, the system measures 1402 an approximate distance to a target vehicle in a lane near one on which the subject vehicle is traveling. The approximate distance may be calculated using a radar system as disclosed herein. The system also calculates 1404 a relative speed of the target vehicle in the lane relative to a speed of the subject vehicle in its own lane. The relative speed (or the speed delta) may also be calculated using a radar system as disclosed herein. In some examples, these two values are inputted into a micro-controller in the light emitting apparatus 230. Alternatively, the micro-controller 404 may receive raw input and calculate the speed delta value and distance value itself. Alternatively, an external source may calculate these values and provide them to the apparatus 230 through an external interface, such as a physical port or through a wireless antenna.

Next in step 1406, the micro-controller may generate a tilt command and/or an illumination command based on the received inputs. The commands may be sent 1408 to their respective destinations: the tilt command is sent to the mounting apparatus 232 to effect a change in orientation of the emission of the one or more light sources attached to the light emitting apparatus 230. Meanwhile, the illumination command may be designated with one of several values. See step 1410. In one example, the illumination command values may be from the enumerated list of low, medium, or high. Based on the value, the LED light source may emit a low illumination 1412, medium illumination 1414, or high illumination 1416. For example, the micro-controller 234 may send an approximate voltage level to the light source in the light emitting apparatus, corresponding to the low value, medium value, or high value of the illumination command. As a result, the light source may emit a brightness of illumination corresponding to the approximate voltage level. The light emitted by the LED may be in an infrared frequency range and create an asymmetrical illumination pattern towards a lane near to the one on which the vehicle is traveling.

In step 1418, in examples where the light emitting apparatus 230 is external to the camera apparatus 201, the light emitting apparatus 230 and the camera apparatus 201 are synchronized by communications with or related to the operational state of each apparatus 201, 230. The apparatuses may communicate directly, or they may communicate with a central mediator or gateway device that controls their operation. As illustrated in FIG. 4, the camera assembly, which comprises the light emitting apparatus and the camera apparatus, may communication with other devices on the network.

Regarding FIG. 15, the graph depicts the relationship 1500 between speed delta values (represented by the Y-axis) and distance values (represented by the X-axis) as they define the operation of an exemplary embodiment of the disclosed system related to an ALPR system. The components of the system may include, in some embodiments, a camera apparatus, a light emitting apparatus, a networked computer communicatively connected via a wireless network with components in the camera apparatus, and/or a vehicle include its telematics sensors, on-board diagnostics (OBD) port, and other components. These interconnected components may coordinate to determine the speed delta value and distance values for any given image capture.

As the graph 1500 illustrates, the autonomous operation of the system may be programmed to operate under the scenarios described in FIG. 15. The components of the system provide one or more of the inputs required by graph 1500. In some examples, the intermediate value may be a fixed, pre-set value. In other examples, the system may operate a feedback loop, as illustrated in FIG. 5 to regularly update the intermediate value to optimize the operation of the system. Meanwhile, software, firmware, or hardware at the vehicle onto which the camera assembly is mounted, may control the settings in accordance with FIG. 15. In some examples, the camera assembly may simply include a computer-executable code that executes on a processor in the camera assembly.

Some illustrative settings of the camera assembly include, but are not limited to, exposure time, illumination power, focus position, sensor gain (e.g., camera ISO speed), aperture size, filters, and the like. In graph 1500, values for the exposure time and illumination power are illustrated for different operating scenarios. Scenarios A, B, C, and D illustrated in counter-clockwise direction in the graph 1500 starting on the lower-right, are described in more detail in relation to FIG. 2D. A person of skill in the art will appreciate that one or more of the settings may be interrelated or dependant. For example, an exposure of $1/25$ sec at f/11, ISO 100 is equivalent to an exposure of $1/400$ sec at f/2.8, ISO 100. In other words, because the shutter speed has been reduced by four stops, this means less light is being captured by the image sensor in the camera assembly. As a result, the aperture is increased in size by four stops to allow more light into the camera assembly. While there are benefits and disadvantages to adjusting the settings in one way versus another, such knowledge would fall within the realm of a person having skill in the art. For example, a person having skill in the art would understand that to maximize exposure, a camera assembly might be set to a large aperture, 6400 ISO, and a slow shutter speed. Meanwhile, to minimize exposure, a camera assembly would be set to a small aperture, 100 ISO, and a fast shutter speed. Of course, the sharpness of the captured image might be effected by depth of field, aperture, and shutter speed settings. In particular, with most embodiments disclosed herein involving a moving subject vehicle capture an image of a moving target vehicle, the ability to capture an image without introducing blurriness or shading or planar warp is a consideration.

Moreover, in practice, target vehicles (e.g., oncoming traffic) on a roadway 102 traveling in a direction opposite to a subject vehicle on the roadway 104 may be traveling at different speeds and be at different distances, as illustrated in FIG. 1A. Meanwhile, the continuous flow of new target vehicles on the roadway 102 (e.g., oncoming traffic and following traffic) adds complexity to image capture. The optimum value for camera settings for each scenario is a non-linear function which depends on the camera performance parameters and detection algorithms. Meanwhile, in practice, a relationship such as depicted in FIG. 15, may provide images of sufficient quality to capture objects and license plate numbers.

Figure 1B:
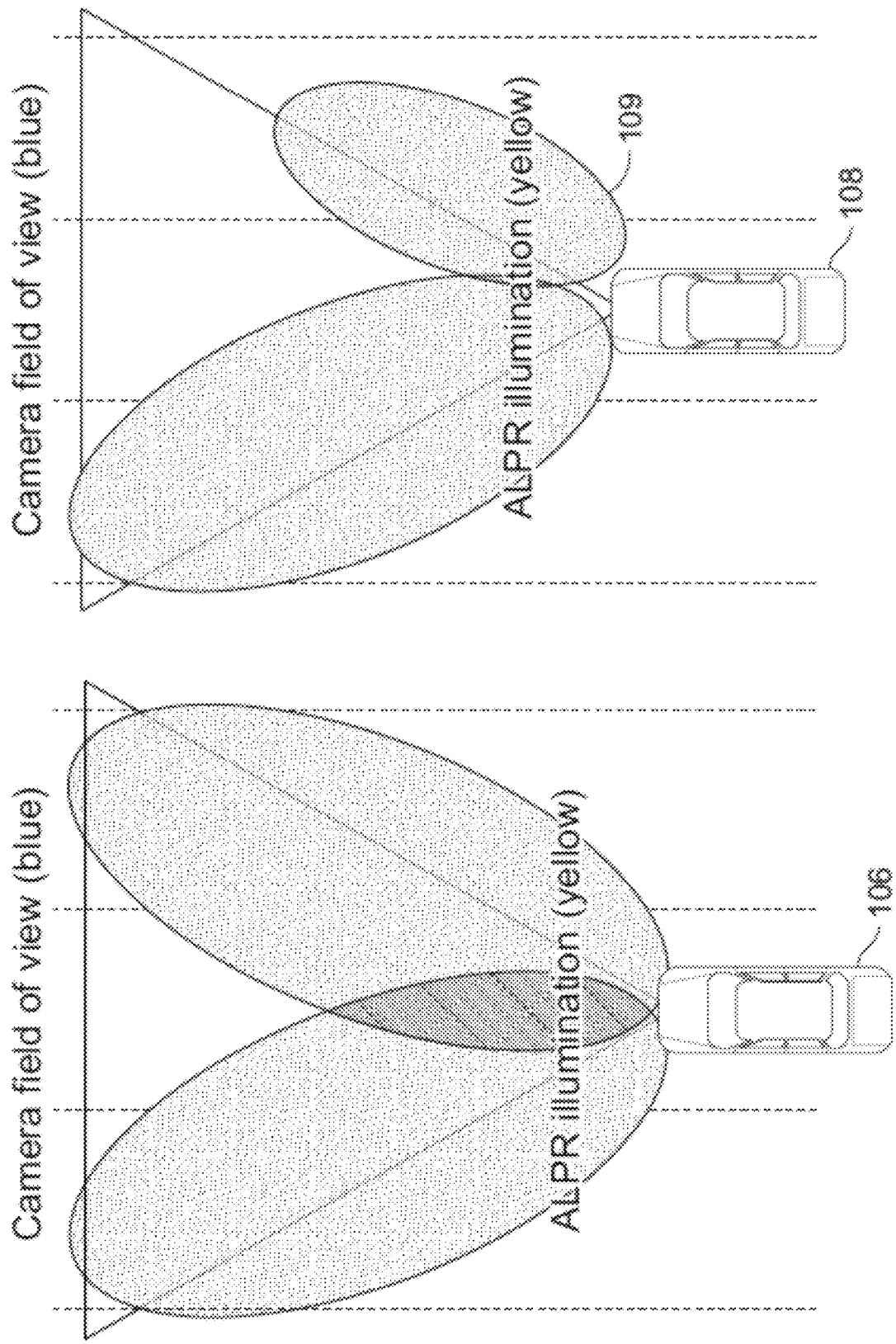

In addition to optimizing camera settings, the disclosed system contemplates a light emitting apparatus 230 coupled to the operation of a camera apparatus 201 to further optimize image capture. FIG. 1B illustrates one example of an asymmetrical illumination pattern created by the light emitting apparatus. In contrast, the illumination pattern in a different example embodiment has been further optimized so that most intensive illumination is optimized to the edges of the camera field of view. Meanwhile, the illumination straight ahead of the camera field of view is reduced. Further optimization of the asymmetric illumination cone may be performed to strengthen the illumination on the left-hand side lane, in the United States, because the oncoming traffic is there. Adding extra illumination in that direction enhances image capture because the relative velocity is higher and requires stronger lighting. Meanwhile, in scenarios such as FIG. 1A, which corresponds to roadways in countries like Britain and India, the oncoming traffic is on the right-hand side lane; thus, the configuration set for the implementation would be reversed for those countries. In yet another example, the illumination cone may be a single illumination cone pointing in the same direction as the camera, however, such an example has not been fully optimized for image capture. This is because the cone of the illumination and the camera field of view point to the same direction; this approach is not optimal in some embodiments because it illuminates the lane in front of the car the best instead of the adjacent lanes.

In some examples, the light emitted by the disclosed system may be adjusted to further refine the illumination cone 108. In one example, the light emitting apparatus 230 may comprise a plurality of light emitting diodes (LED) oriented in a grid pattern. Each LED may be coupled to a mounting apparatus that allows each individual LED to be re-oriented as desired by the system. For example, each LED may be separately attached to a motorized mechanism (or other mechanism) to allow the system to roll, pitch, and/or yaw the LED as appropriate. In some examples, a group of LEDs may be attached to a single mounting apparatus, thus they may all re-orient in unison. The grouping of LEDs may be by column, by row, or by an area of the grid. Moreover, some LEDs may be tilted in one direction, but others are tilted in a different direction. Thus, the illumination pattern may be tailored and tested to identify an optimal configuration in particular geographic locations and environments. In yet another example, the plurality of LEDs in the light emitting apparatus may be individually controlled. For example, one or more LEDs may be sub-grouped and activated or deactivated together so as to emit an illumination pattern where the strongest light is pointed to the edge of the camera field of view 106. As used in this example, activated and deactivated includes not only turning on and turning off an LED, but also dimming the illumination intensity of an LED. Alternatively, the illumination pattern may be such that the strongest light is directed to oncoming traffic 108. The aforementioned sub-groups may be static, non-movable LEDs without a mounting apparatus to effectuate tilting; alternatively, the mounting apparatus and sub-group activation/deactivation feature may be used together. The sub-groups may be a plurality of LEDs in a single row or single column, or may be another pattern of LEDs (e.g., diagonal line, circular pattern, semi-circular pattern, elliptical pattern, or other pattern).

Many alternatives to the systems and devices described herein are possible. Individual modules/components or subsystems can be separated into additional modules/components or subsystems or combined into fewer modules/components or subsystems. Modules/components or subsystems can be omitted or supplemented with other modules/components or subsystems. Functions that are indicated as being performed by a particular device, module/components, or subsystem may instead be performed by one or more other devices, modules/components, or subsystems.

Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios.

Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules/components or software processes concurrently handling one or more of the illustrated processing stages. As another example, processing stages that are indicated as being performed by a particular device or module may instead be performed by one or more other devices or modules/components.

In this description herein of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is noted that these connections are general and, unless specified otherwise, may be direct or indirect, wired or wireless, and that the specification is not intended to be limiting in this respect.

In general, functionality of computing devices described herein may be implemented in computing logic embodied in hardware or software instructions, which can be written in a programming language, such as but not limited to C, C++, COBOL, JAVA™ PHP, Perl, Python, Ruby, HTML, CSS, JavaScript, VBScript, ASPX, Microsoft.NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention. Moreover, the foregoing description discusses illustrative embodiments of the present invention, which may be changed or modified without departing from the scope of the present invention as defined in the claims. Examples listed in parentheses may be used in the alternative or in any practical combination. As used in the specification and claims, the words comprising, including, and having introduce an open-ended statement of component structures and/or functions. In the specification and claims, the words a and an are used as indefinite articles meaning one or more. When a descriptive phrase includes a series of nouns and/or adjectives, each successive word is intended to modify the entire combination of words preceding it. While for the sake of clarity of description, several specific embodiments of the invention have been described, the scope of the invention is intended to be measured by the claims as set forth below.

We claim:

1. A license plate recognition ("LPR") system attached to a law enforcement vehicle, the system comprising:
    a camera device comprising an image sensor, the camera device is configured to capture images comprising long-exposure images and short-exposure images with the image sensor, and the image sensor is configured to nearly simultaneously output a long-exposure image of a field of view and a short-exposure image of the field of view;
    a memory configured to store the images outputted by the image sensor;
    a processor, which is communicatively coupled to the memory, programmed to:
        receive, from the memory, a first long-exposure image, wherein the first long-exposure image is captured with a first long-exposure setting of the camera device;
        receive, from the memory, a first short-exposure image, wherein the first short-exposure image is captured with a first short-exposure setting of the camera device;
        detect a first license plate and a second license plate in the first long-exposure image, wherein the first license plate is in a first portion of the field of view and the second license plate is in a second portion of the field of view, and wherein the first portion of the field of view is different than the second portion of the field of view; and
        detect the first license plate and the second license plate in the first short-exposure image, wherein the first license plate is in the first portion of the field of view and the second license plate is in the second portion of the field of view, and wherein characters of the second license plate have a greater probability of being recognized by a computerized optical character recognition platform in the first short-exposure image than in the first long-exposure image.

2. The system of claim 1, wherein the processor is further programmed to:
    calculate a relative speed of the second license plate using motion blur analysis of the second license plate in the first short-exposure image; and
    capture, using the image sensor, a next short-exposure image with an exposure setting based on the calculated relative speed to reduce motion blur.

3. The system of claim 1 further comprising:
    a controller communicatively connected to the camera device, wherein the controller is configured to adjust an exposure setting of the image sensor to affect the capture of the long-exposure images and the short-exposure images;
    and wherein the processor is further programmed to:
        instruct the controller to adjust the first long-exposure setting and the first short-exposure setting of the camera device by an amount;
        capture, using the image sensor, a second long-exposure image having a second long-exposure setting and a second short-exposure image having a second short-exposure setting;
        detect the first license plate and the second license plate in the second short-exposure image;
        align the second license plate in the first short-exposure image with the second license plate in the second short-exposure image;
        transform the second portion of each of the first short-exposure image and the second short-exposure image by geometrically rectifying to accommodate for relative positions of the second license plate; and
        merge at least the first short-exposure image and the second short-exposure image into a consolidated image, wherein characters of the second license plate have a greater probability of being recognized by the computerized optical character recognition platform in the consolidated image than the first short-exposure image, the second short-exposure image, the first long-exposure image, or the second long-exposure image.

4. The system of claim 3, wherein the merging of images into a consolidated image comprises merging additional short-exposure images from among the images captured by the LPR system, wherein the additional short-exposure images include the second license plate in the second portion of the field of view.

5. The system of claim 1, wherein the image sensor nearly simultaneously outputting images of the field of view comprises configuring the camera device to capture in a serial manner wherein the setting of the camera device is alternated every other frame from the long-exposure setting to the short-exposure setting, wherein the image sensor is a single image sensor.

6. The system of claim 1, wherein the image sensor nearly simultaneously outputting images of the field of view comprises configuring the camera device to capture in a parallel manner wherein the setting of the camera device is the long-exposure setting for a first set of lines in a frame while simultaneously to the short-exposure setting for a second set of lines in the same frame, wherein the first set of lines is different than the second set of lines.

7. The system of claim 1, wherein the image sensor comprises a high dynamic range (HDR) sensor, and the HDR sensor nearly simultaneously outputting images of the field of view comprises separately outputting the long-exposure image and the short-exposure image without consolidating the long-exposure image and the short-exposure image into a single, consolidated image.

8. The system of claim 1, wherein the processor is further programmed to:
    instruct a controller to adjust, for each of a plurality of images, at least one of a shutter speed setting, ISO setting, zoom setting, and exposure setting of the camera device such that a subsequent image is captured by the camera device with a different setting than that used to capture an immediately preceding image.

9. The system of claim 1, wherein characters of the first license plate have a greater probability of being recognized by a computerized optical character recognition platform in the first long-exposure image than in the first short-exposure image.

10. The system of claim 1, wherein the processor comprises an ASIC processor, and the camera device is communicatively coupled to the processor by a wired connection.

11. The system of claim 1, wherein the camera device is a camera assembly further operating as an enclosure for the image sensor, controller, processor, and the memory arranged therein.

12. A method involving a license plate recognition ("LPR") system comprising a camera device with an image sensor, a processor, and a memory, the method comprising steps to:
receive, by the processor from the memory, a first long-exposure image of a field of view captured by the image sensor with a long-exposure setting;
receive, by the processor from the memory, a first short-exposure image of the same field of view captured by the image sensor with a short-exposure setting, wherein the short-exposure image and the long-exposure image are nearly simultaneously outputted by the image sensor;
detect, by the processor, a first license plate and a second license plate in the first long-exposure image, wherein the first license plate is in a first portion of the field of view and the second license plate is in a second portion of the field of view, and wherein the first portion of the field of view is different than the second portion of the field of view; and
detect, by the processor, the first license plate and the second license plate in the first short-exposure image, wherein characters of the first license plate have a greater probability of being recognized by a computerized optical character recognition platform in the first long-exposure image than in the first short-exposure image.

13. The method of claim 12, further comprising steps to:
calculate, by the processor, a relative speed of the first license plate using motion blur analysis of the first license plate in the first long-exposure image; and
capture, by the image sensor, a next long-exposure image with an exposure setting based on the calculated relative speed to reduce motion blur.

14. The method of claim 12, wherein the LPR system further comprises a controller communicatively coupled to the camera device, the method further comprising steps to:
adjust, by the controller, the long-exposure setting of the camera device by a first amount and the short-exposure setting of the camera device by a second amount;
capture, using the image sensor, a second long-exposure image with the adjusted long-exposure setting and a second short-exposure image with the adjusted short-exposure setting;
detect the first license plate in the first portion of the second long-exposure image and the second short-exposure image;
align the first license plate in the first long-exposure image with the first license plate in the second long-exposure image;
transform the first portion of each of the first long-exposure image and the second long-exposure image by geometrically rectifying to accommodate for relative positions of the first license plate; and
merge at least the first long-exposure image and the second long-exposure image into a consolidated image, wherein characters of the first license plate have a greater probability of being recognized by the computerized optical character recognition platform in the consolidated image than the first short-exposure image, the second short-exposure image, the first long-exposure image, or the second long-exposure image.

15. The method of claim 14, wherein the capturing, by the image sensor, of the second long-exposure image and the second short-exposure image occurs nearly simultaneously in one of a serial manner or a parallel manner,
wherein in the serial manner, the camera device is alternated every other frame from the adjusted long-exposure setting to the adjusted short-exposure setting; and
wherein in the parallel manner, the camera device is set to the adjusted long-exposure setting for a first set of lines in a frame while simultaneously to the adjusted short-exposure setting for a second set of lines in the same frame, wherein the first set of lines is different than the second set of lines.

16. The method of claim 15, wherein the image sensor comprises a high dynamic range (HDR) sensor, and the nearly simultaneously outputting by the HDR sensor of the long-exposure image and the short-exposure image occurs without consolidating the long-exposure image and the short-exposure image into a single, consolidated image.

17. The method of claim 15, further comprising steps to:
adjust, by the controller, for each of a plurality of images, at least one of a shutter speed setting, ISO setting, zoom setting, and exposure setting of the camera device such that a subsequent image is captured by the camera device with a different setting than that used to capture an immediately preceding image.

18. A tangible non-transitory computer-readable medium storing executable instructions that, when executed by a processor of a license plate recognition ("LPR") system, cause the LPR system to: receive, from a memory of the LPR system, a first long-exposure image of a field of view, wherein the first long-exposure image is captured, using an image sensor, with a long-exposure setting of a camera device of the LPR system; receive, from a memory of the LPR system, a first short-exposure image of the same field of view, wherein the first short-exposure image is captured, using the image sensor, with a short-exposure setting of the camera device; detect a license plate in the first long-exposure image, wherein the license plate is in a first portion of the field of view; detect the license plate in the first short-exposure image, wherein the license plate is in the first portion of the field of view, wherein characters of the license plate have a greater probability of being recognized by a computerized optical character recognition platform in the first long-exposure image than in the first short-exposure image; instruct, a controller communicatively coupled to the processor and camera device, to adjust the long-exposure setting of the camera device by a first amount and to adjust the short-exposure setting of the camera device by a second amount, wherein the long-exposure setting and short-exposure setting comprise at least one of a shutter speed setting, ISO setting, zoom setting, and exposure setting of the camera device; capture, using the image sensor, a second long-exposure image with the adjusted long-exposure setting and a second short-exposure image with the adjusted short-exposure setting; detect the license plate in the second long-exposure image and the second short-exposure image;

align the license plate in the first long-exposure image with the license plate in the second long-exposure image; transform the first portion of each of the first long-exposure image and the second long-exposure image by geometrically rectifying to accommodate for relative positions of the license plate; and merge at least the first long-exposure image and the second long-exposure image into a consolidated image, wherein characters of the license plate have a greater probability of being recognized by the computerized optical character recognition platform in the consolidated image than the first short-exposure image, the second short-exposure image, the first long-exposure image, or the second long-exposure image.

19. The computer-readable medium of claim 18, wherein the first amount and second amount are one of random amounts, predetermined amounts, and an amount based on a calculated relative speed of the license plate using motion blur analysis of the license plate in the first long-exposure image.

20. The computer-readable medium of claim 18, wherein the capturing, by the image sensor, of the second long-exposure image and the second short-exposure image occurs nearly simultaneously in one of a serial manner or a parallel manner,
 wherein in the serial manner, the camera device is alternated every other frame from the adjusted long-exposure setting to the adjusted short-exposure setting; and
 wherein in the parallel manner, the camera device is set to the adjusted long-exposure setting for a first set of lines in a frame while simultaneously to the adjusted short-exposure setting for a second set of lines in the same frame, wherein the first set of lines is different than the second set of lines.

* * * * *